US008791877B2

(12) United States Patent
Kikuchi et al.

(10) Patent No.: US 8,791,877 B2
(45) Date of Patent: Jul. 29, 2014

(54) IMAGE DISPLAY SYSTEM, IMAGE DISPLAY DEVICE, AND IMAGE DISPLAY METHOD

(75) Inventors: Yosuke Kikuchi, Suwa (JP); Yasuhiko Komatsu, Suwa-gun (JP); Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 643 days.

(21) Appl. No.: 12/789,495

(22) Filed: May 28, 2010

(65) Prior Publication Data

US 2010/0302130 A1    Dec. 2, 2010

(30) Foreign Application Priority Data

May 29, 2009   (JP) ................................. 2009-129922

(51) Int. Cl.
*G09G 5/00*   (2006.01)
(52) U.S. Cl.
USPC .............................. 345/1.3; 345/2.1; 345/2.2
(58) Field of Classification Search
USPC ............................................ 345/1.3, 2.1, 2.2
See application file for complete search history.

(56) References Cited

U.S. PATENT DOCUMENTS

| | | | | |
|---|---|---|---|---|
| 6,008,809 | A * | 12/1999 | Brooks .......................... | 715/792 |
| 6,473,088 | B1 * | 10/2002 | Matsumoto et al. ........... | 345/530 |
| 6,556,724 | B1 * | 4/2003 | Chang et al. ................... | 382/299 |
| 6,600,500 | B1 * | 7/2003 | Yamamoto ..................... | 715/795 |
| 7,257,777 | B1 * | 8/2007 | Kanevsky et al. ............. | 715/794 |
| 7,486,254 | B2 * | 2/2009 | Suzuki et al. .................. | 345/2.1 |
| 7,551,175 | B2 | 6/2009 | Sakanishi et al. | |
| 7,682,028 | B2 * | 3/2010 | Maeda et al. ................... | 353/30 |
| 7,768,576 | B2 * | 8/2010 | Yui et al. ....................... | 348/564 |
| 7,773,075 | B2 | 8/2010 | Otsuka et al. | |
| 7,777,693 | B2 * | 8/2010 | Ohuchi .......................... | 345/2.2 |
| 8,112,716 | B2 | 2/2012 | Kobayashi | |
| 8,149,335 | B2 | 4/2012 | Sudo et al. | |
| 8,243,198 | B2 * | 8/2012 | Lee et al. ...................... | 348/588 |
| 2002/0089518 | A1 * | 7/2002 | Shigeta .......................... | 345/629 |
| 2003/0189637 | A1 * | 10/2003 | Nakade et al. ............. | 348/14.08 |
| 2004/0130502 | A1 * | 7/2004 | Sato et al. ....................... | 345/2.1 |
| 2004/0130568 | A1 * | 7/2004 | Nagano et al. ................. | 345/733 |
| 2004/0150627 | A1 * | 8/2004 | Luman et al. .................. | 345/173 |
| 2004/0217946 | A1 * | 11/2004 | Hamano ........................ | 345/173 |
| 2007/0257927 | A1 * | 11/2007 | Sakanishi et al. ............. | 345/581 |
| 2008/0036849 | A1 * | 2/2008 | Oh et al. ..................... | 348/14.07 |

(Continued)

FOREIGN PATENT DOCUMENTS

| | | | |
|---|---|---|---|
| JP | 2003-046968 A | 2/2003 |
| JP | 4010198 B | 2/2004 |
| JP | 2007-257220 A | 10/2007 |
| JP | 2008-033918 A | 2/2008 |

(Continued)

*Primary Examiner* — Christopher E Leiby
(74) *Attorney, Agent, or Firm* — ALG Intellectual Property, LLC

(57) ABSTRACT

An image display system includes: a plurality of image supply devices each having an image display section, and an image transmission section adapted to generate a supply image and to externally transmit the supply image; and an image display device capable of dividing a common screen area into one or more screen areas, and of displaying the supply image supplied from each of the image supply devices in the one or more screen areas, wherein each of the image supply devices displays a common screen area operating image to operate a display state of the common screen area in the image display section, and supplies a display image of the image display section to the image display device as the supply image, and the image display device changes the display state of the common screen area in accordance with an operation in each of the image supply devices.

14 Claims, 32 Drawing Sheets

(56) References Cited

U.S. PATENT DOCUMENTS

| | | |
|---|---|---|
| 2009/0043846 A1 | 2/2009 | Inoue |
| 2009/0135089 A1* | 5/2009 | Konishi et al. ................. 345/1.3 |
| 2012/0019560 A1 | 1/2012 | Inoue |
| 2012/0102430 A1 | 4/2012 | Kobayashi |

FOREIGN PATENT DOCUMENTS

| | | |
|---|---|---|
| JP | 2009-025920 A | 2/2009 |
| JP | 2009-044328 A | 2/2009 |
| WO | WO-2005-088602 A | 9/2005 |

* cited by examiner

FIG. 11A
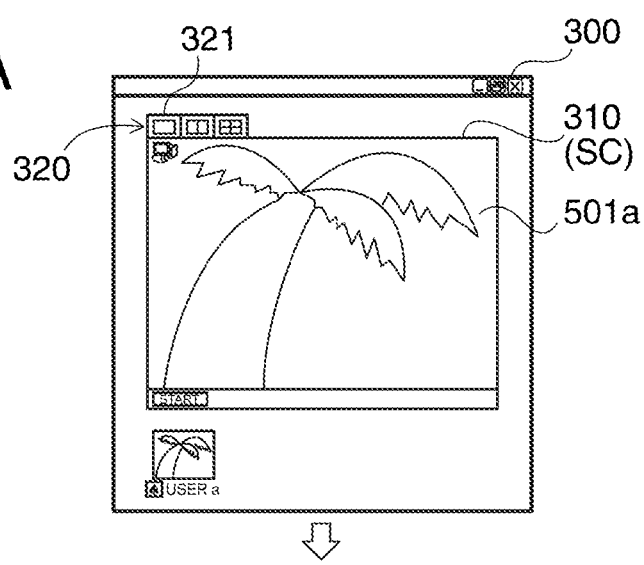
FIG. 11B
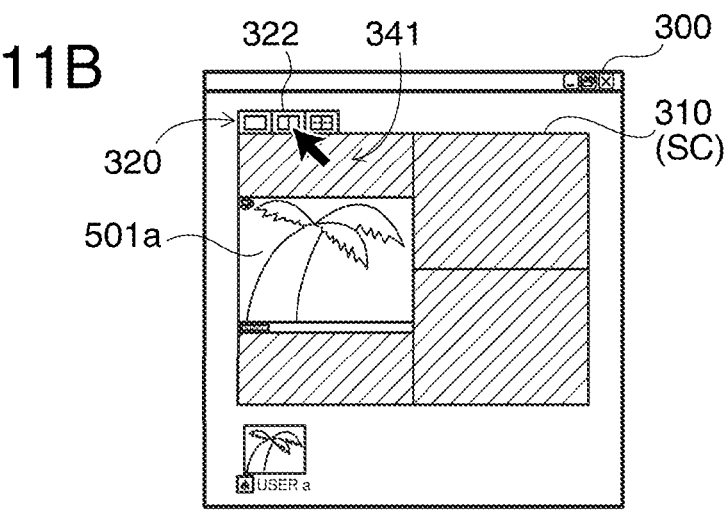
FIG. 11C
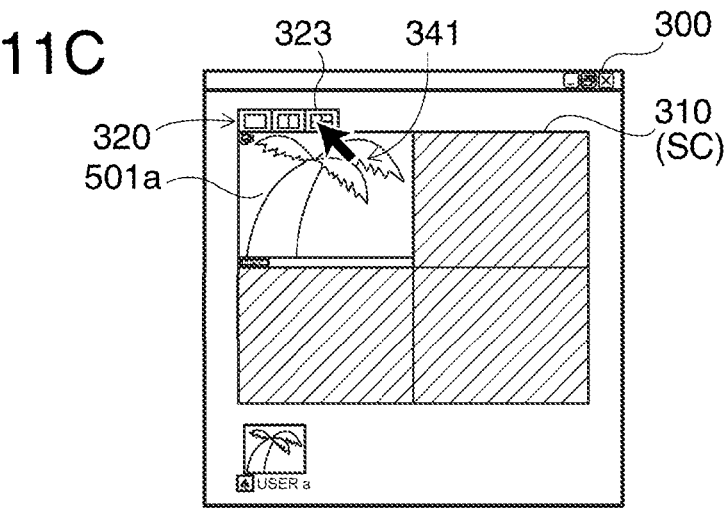

FIG. 12A1
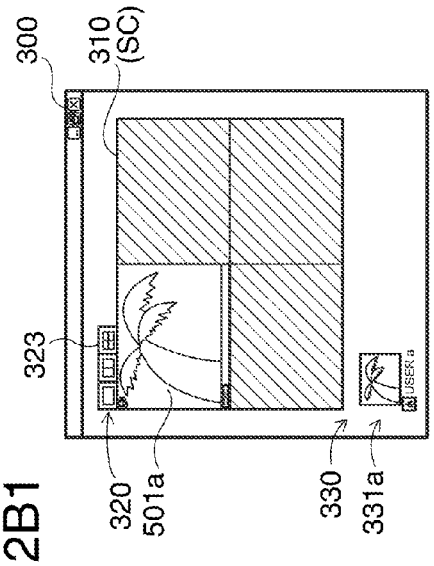
FIG. 12B1
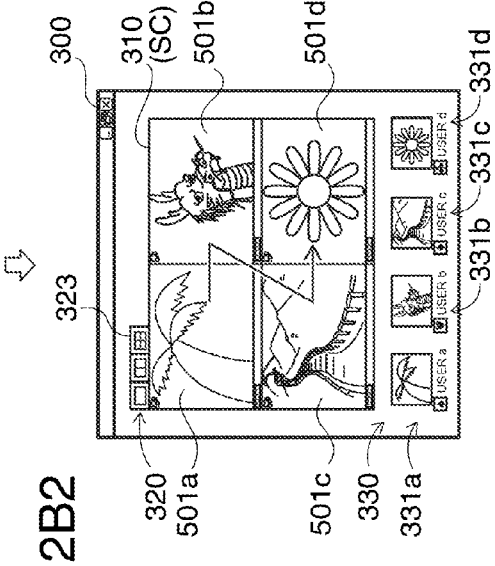
FIG. 12A2
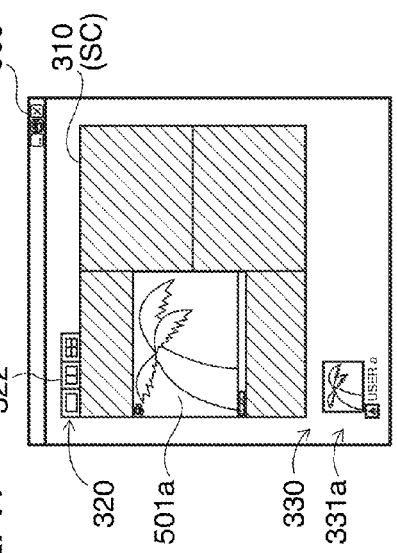
FIG. 12B2
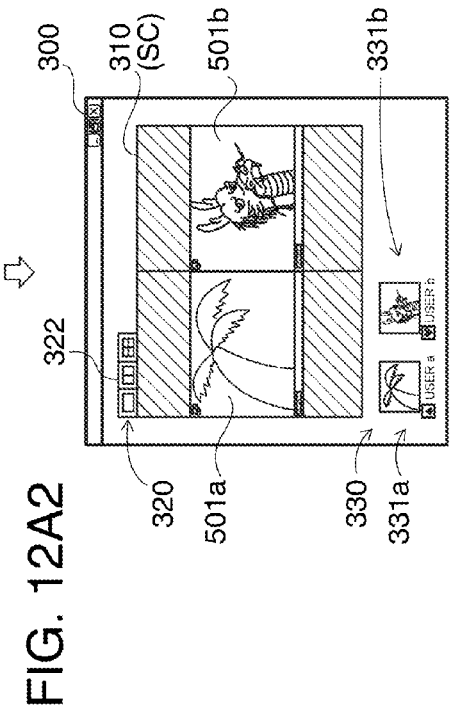

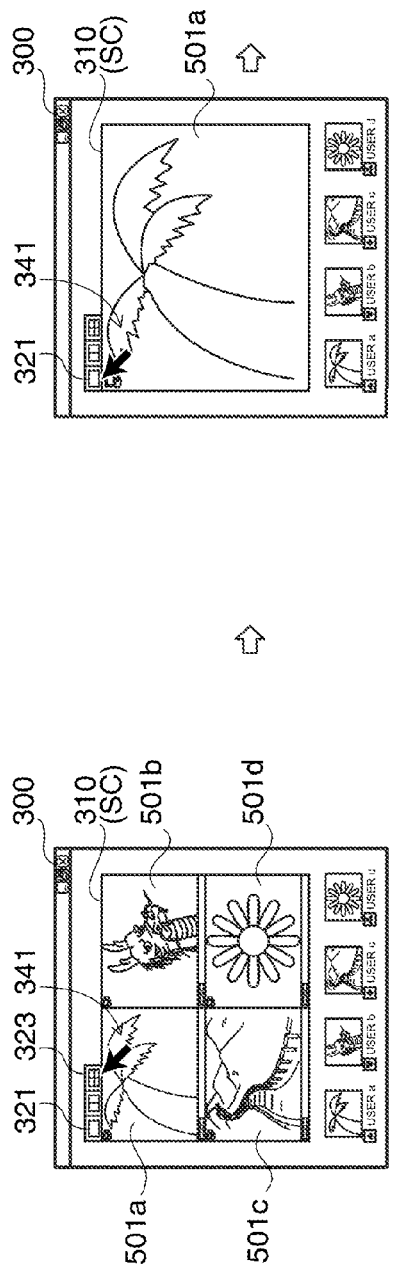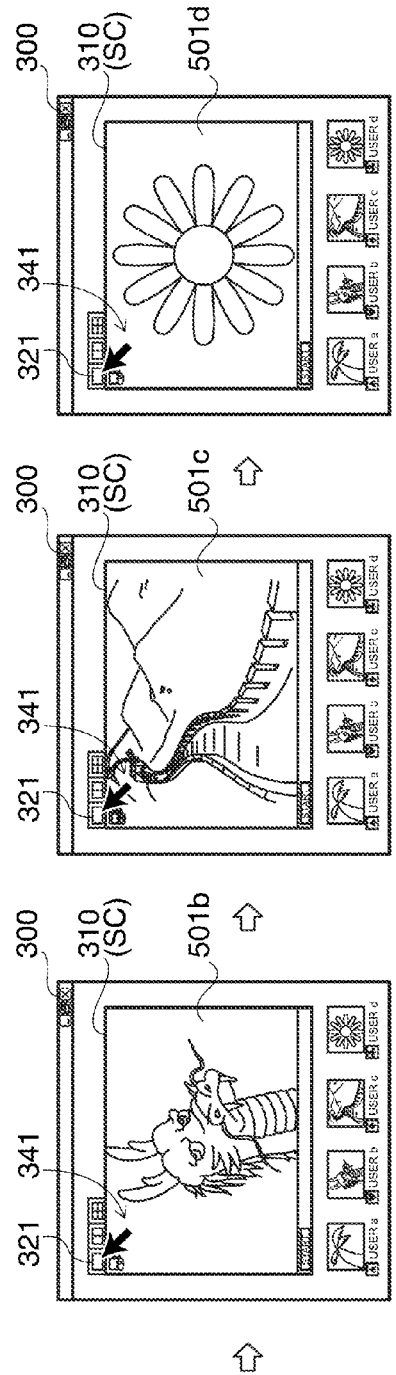

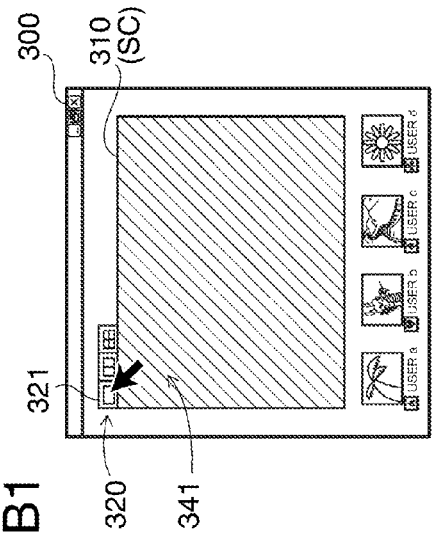
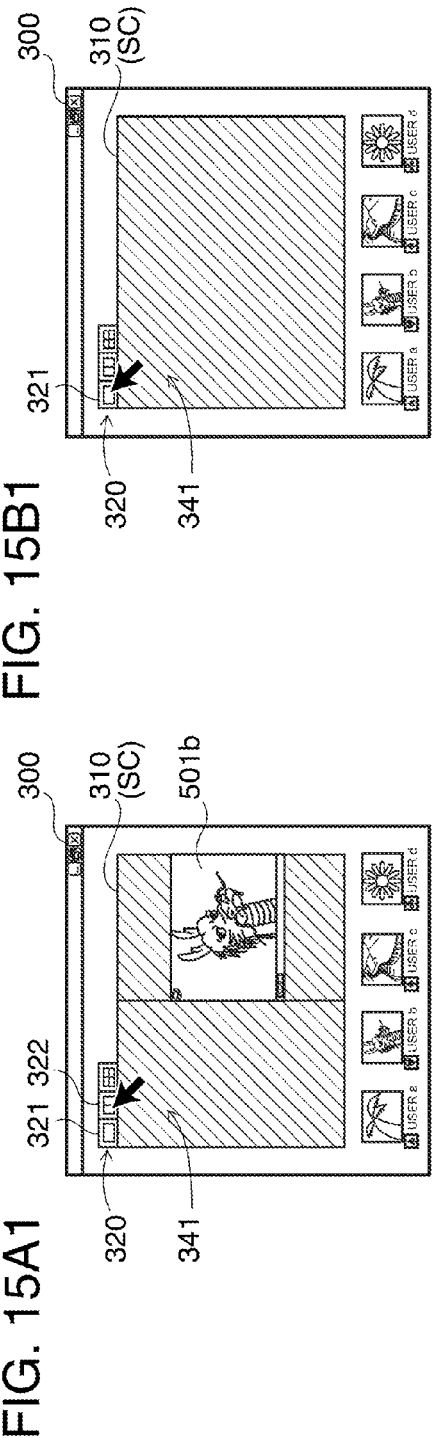
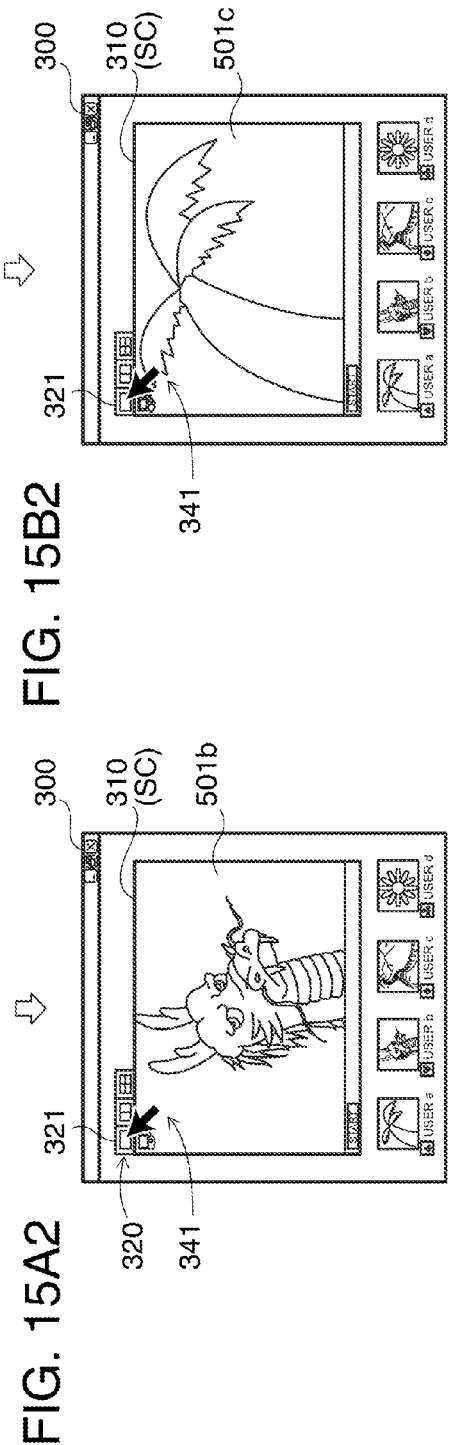

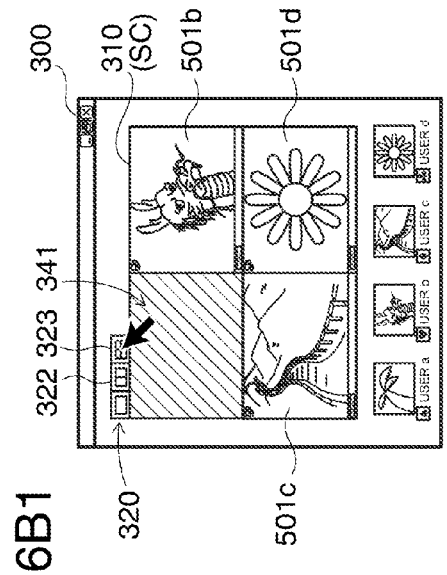
FIG. 16A1
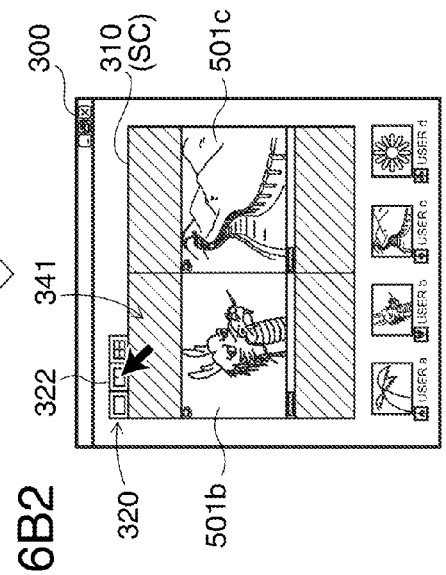
FIG. 16B1
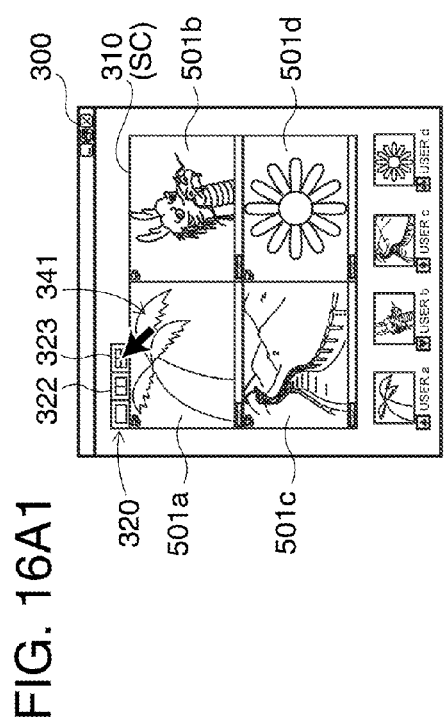
FIG. 16A2
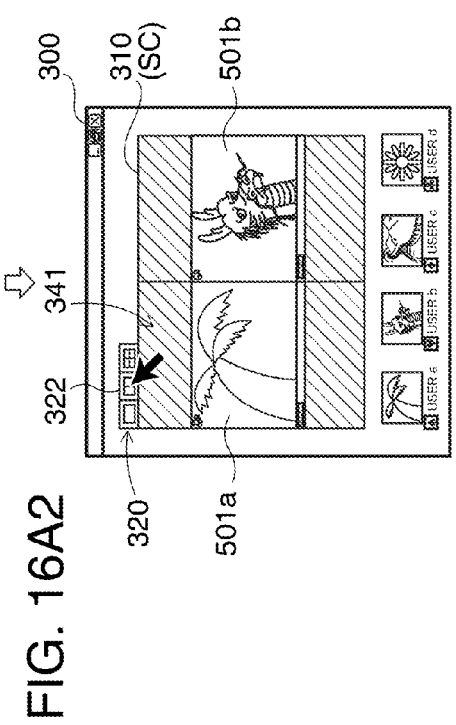
FIG. 16B2

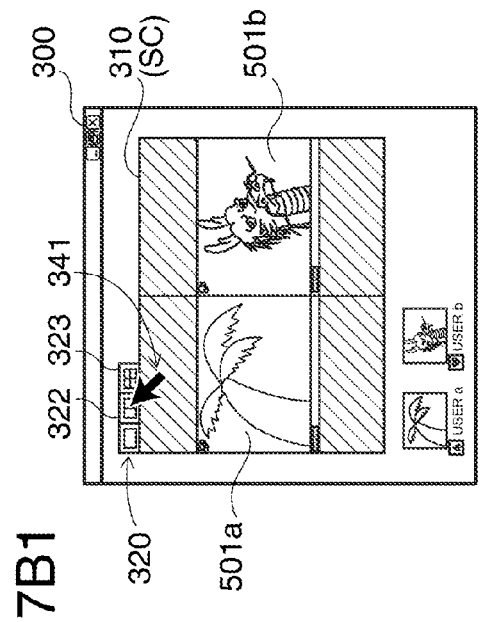
FIG. 17A1
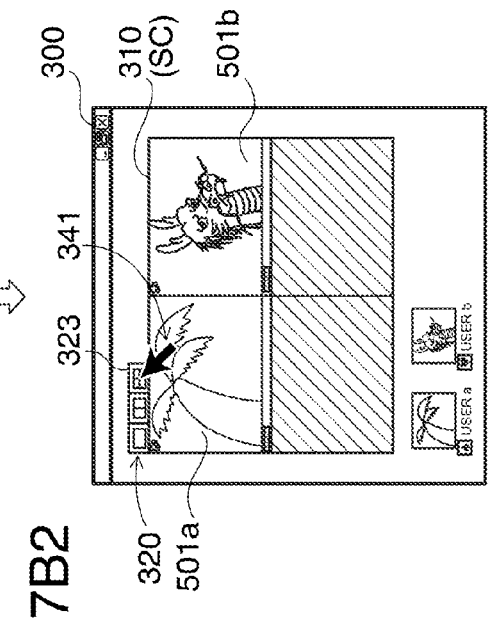
FIG. 17A2
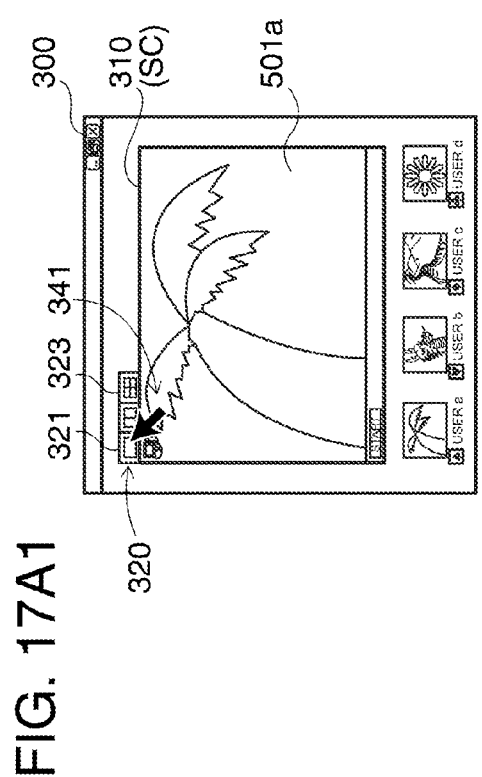
FIG. 17B1
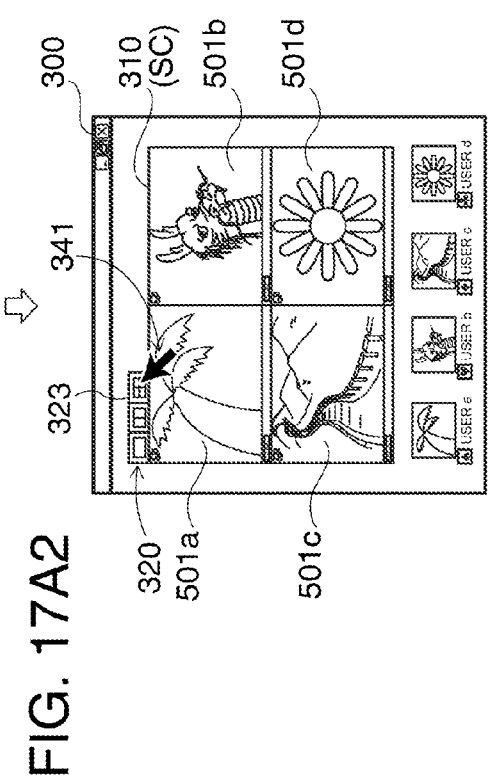
FIG. 17B2

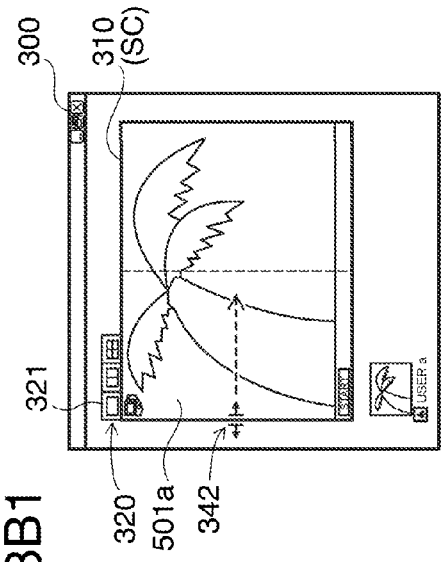
FIG. 18A1
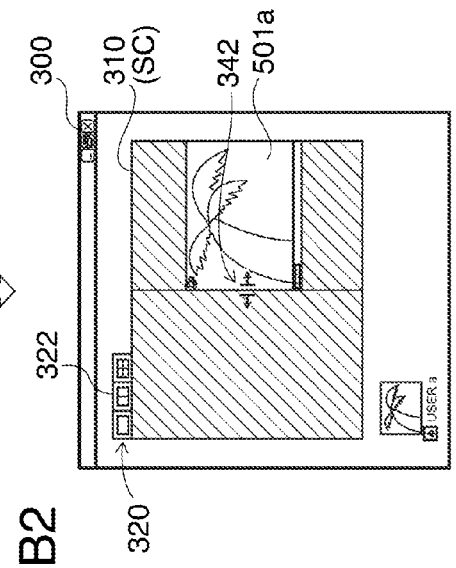
FIG. 18B1
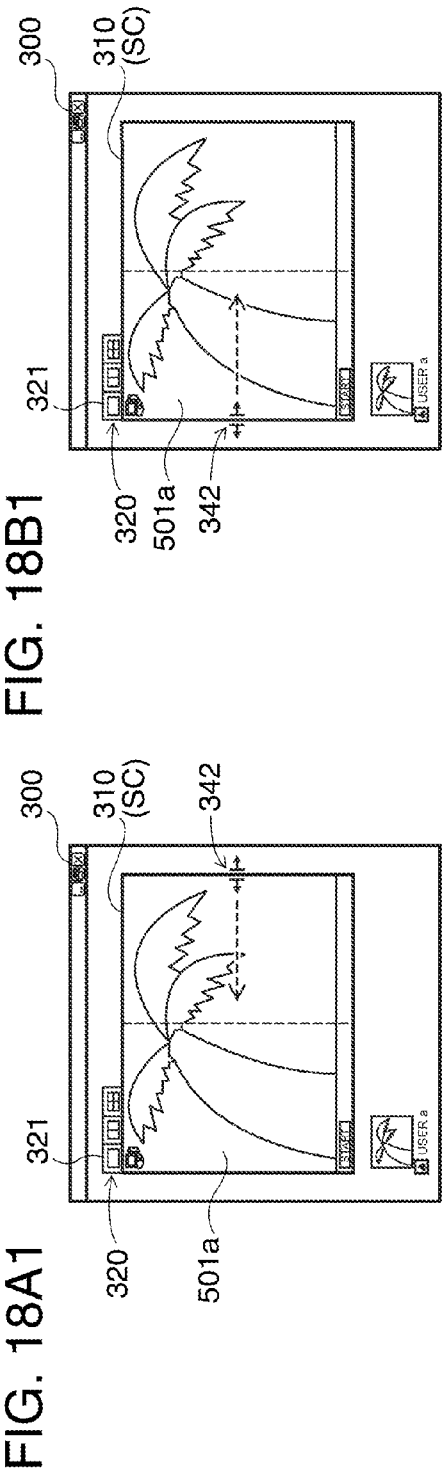
FIG. 18A2
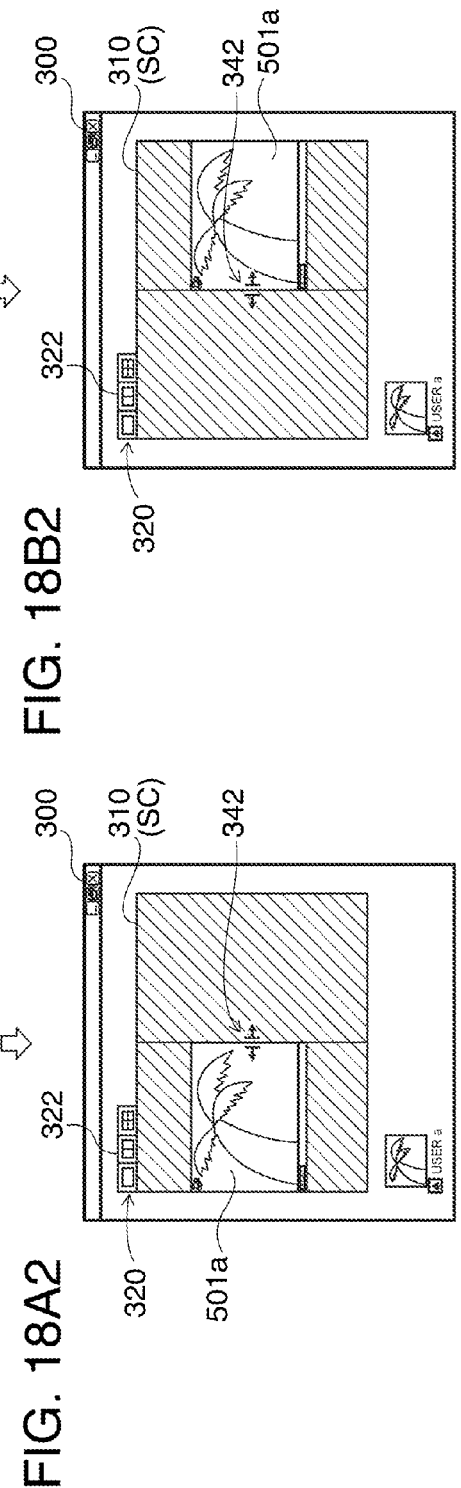
FIG. 18B2

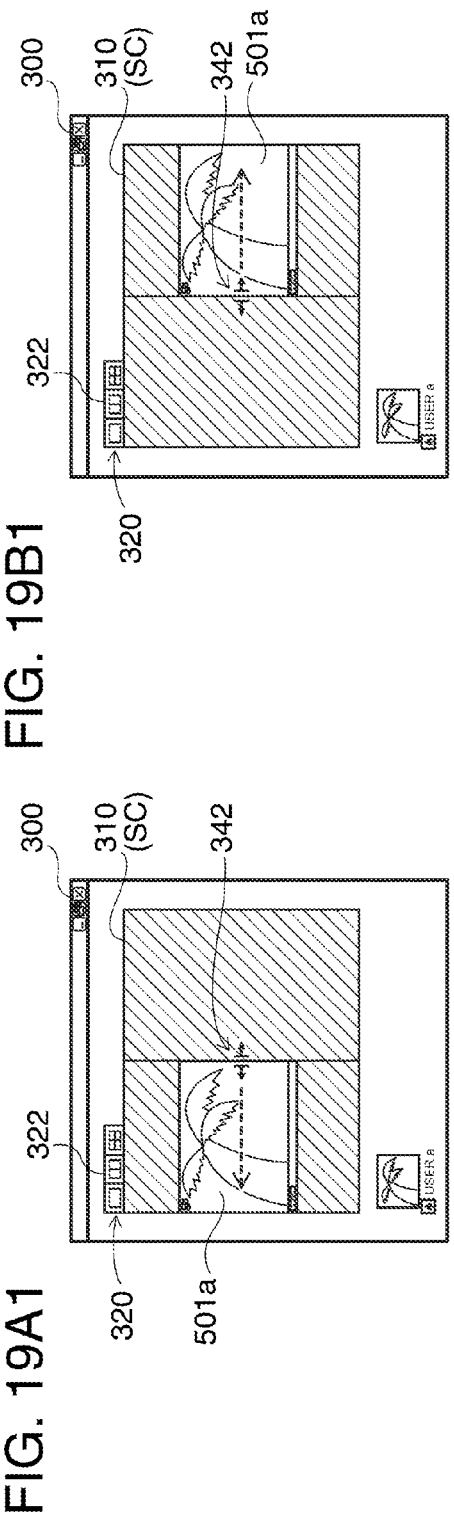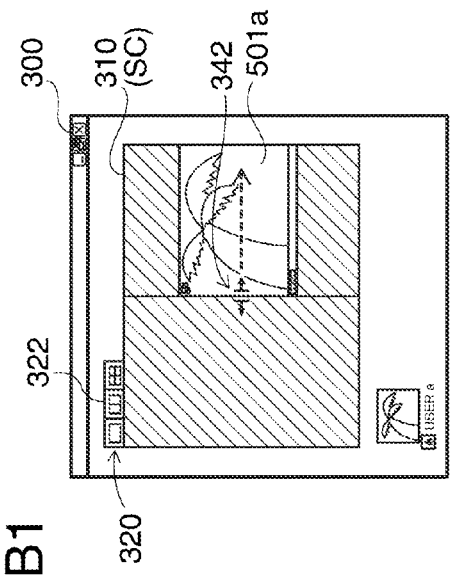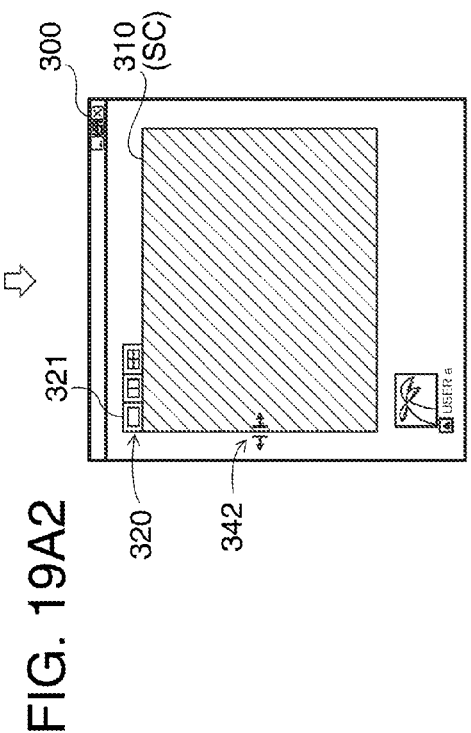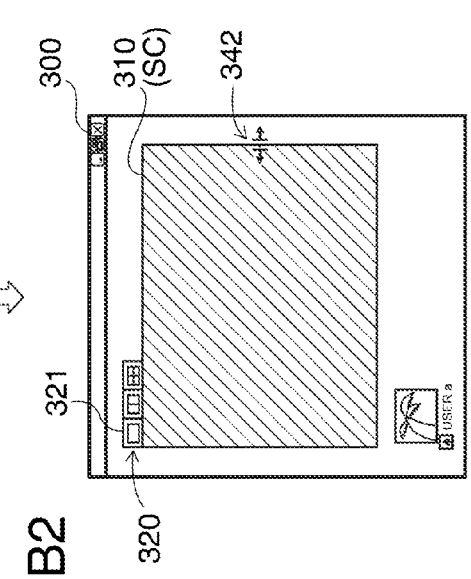
FIG. 19A1   FIG. 19B1
FIG. 19A2   FIG. 19B2

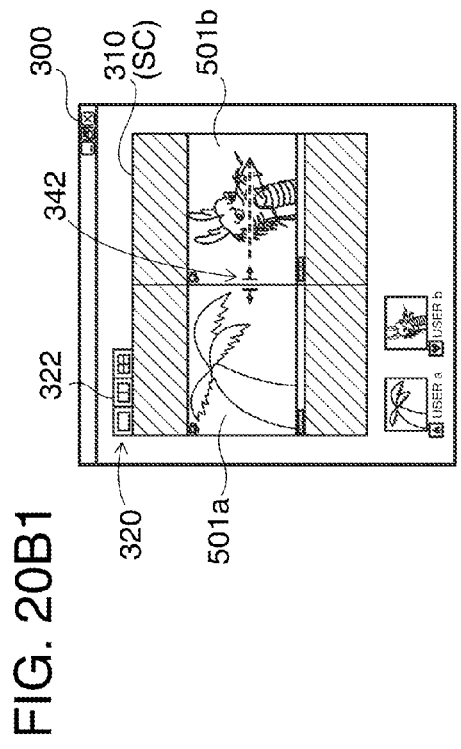
FIG. 20A1
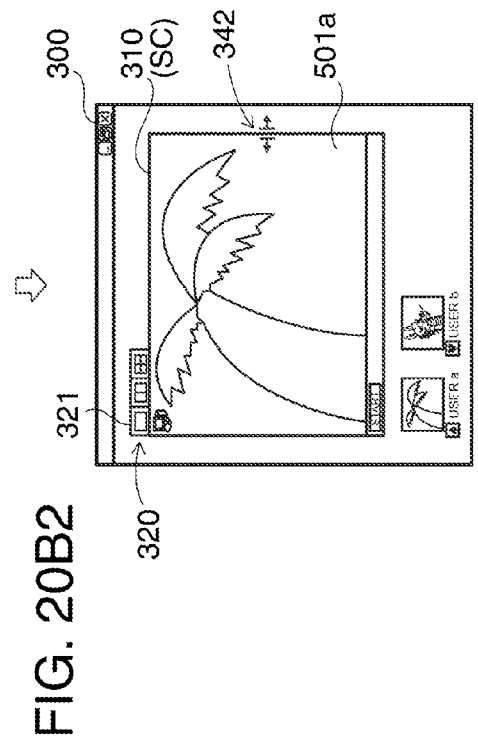
FIG. 20B1
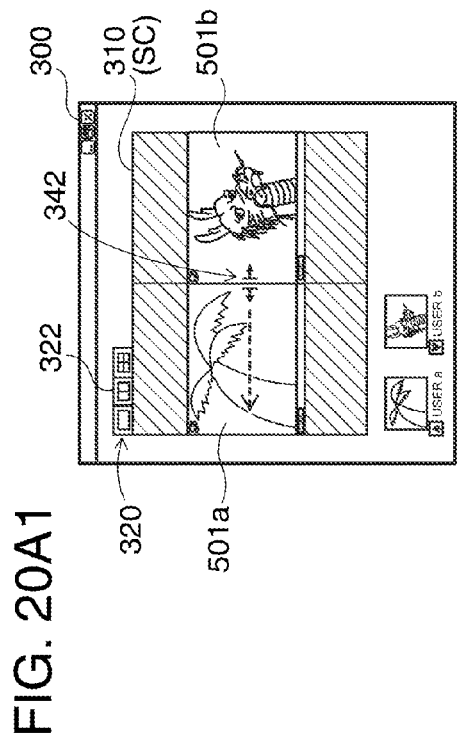
FIG. 20A2
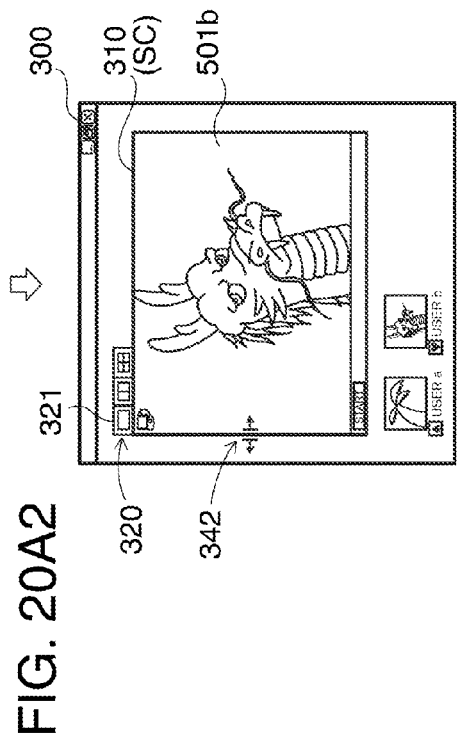
FIG. 20B2

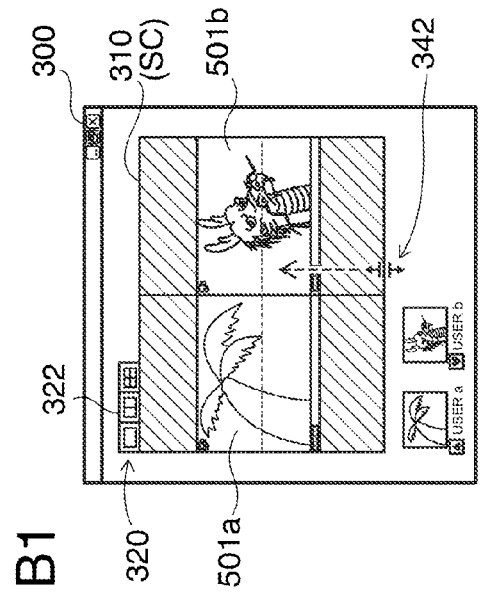
FIG. 21A1
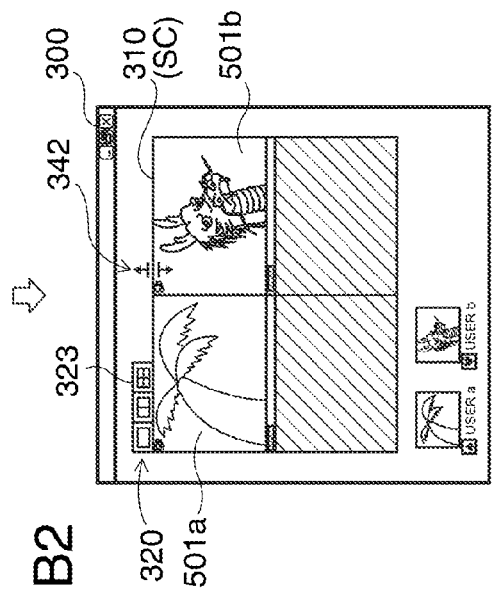
FIG. 21B1
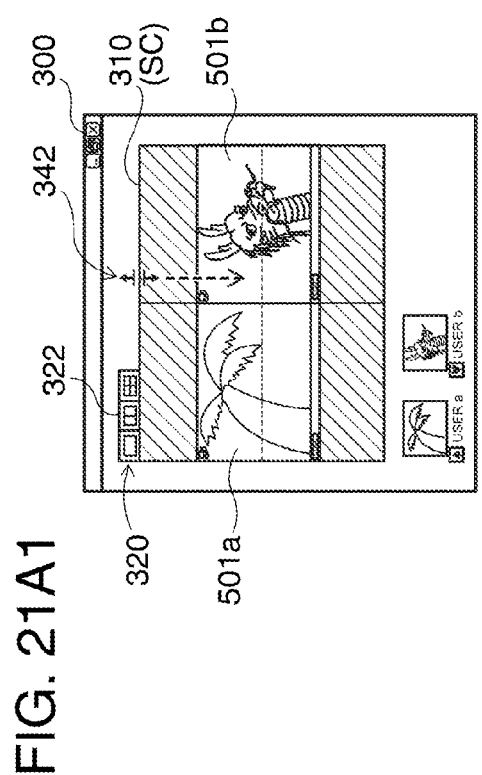
FIG. 21A2
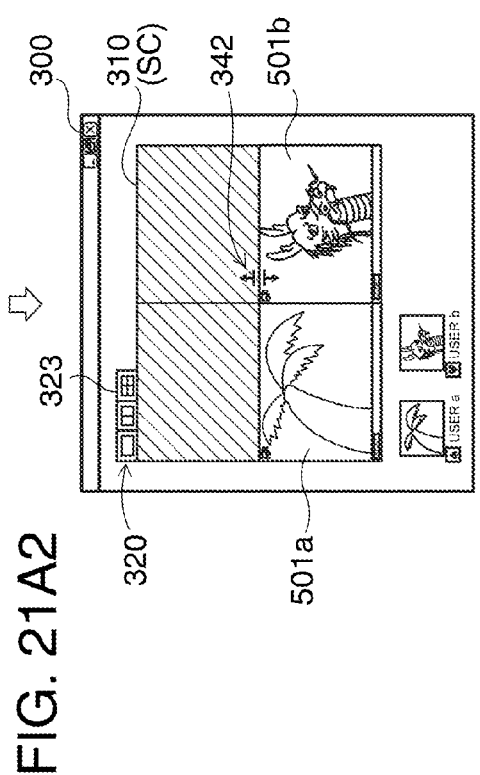
FIG. 21B2

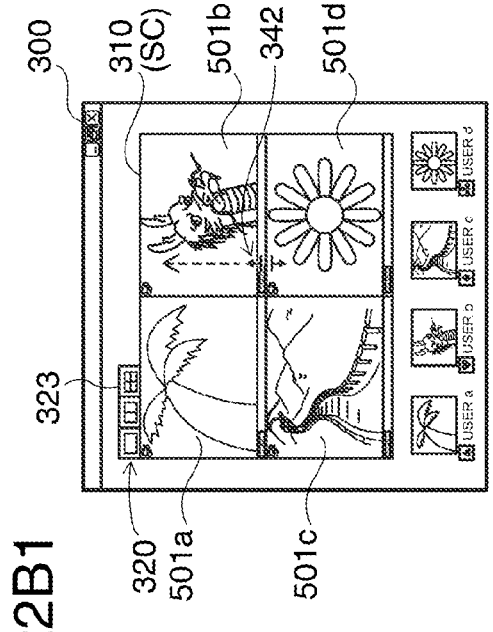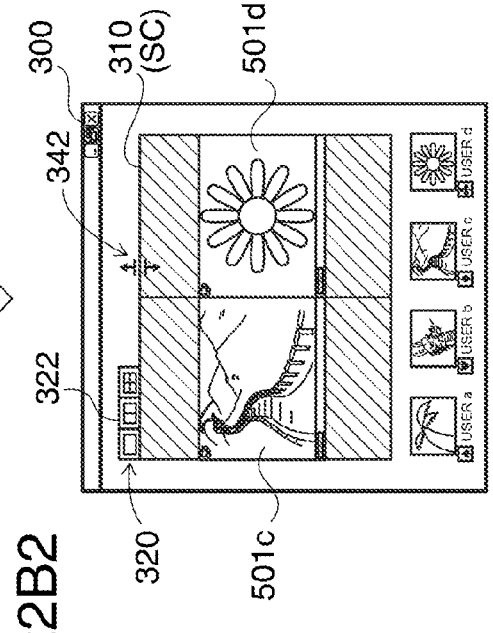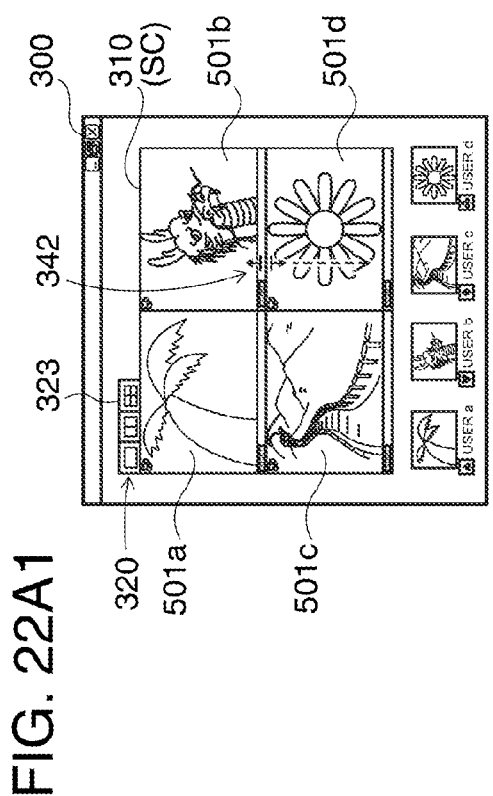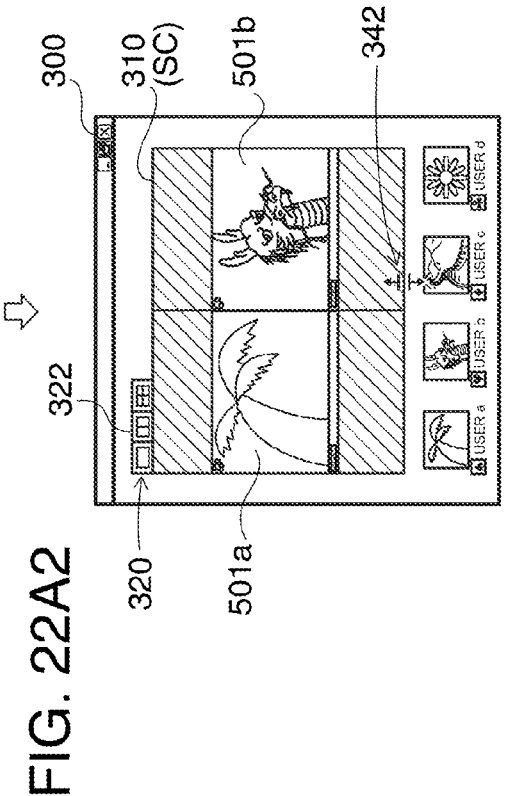

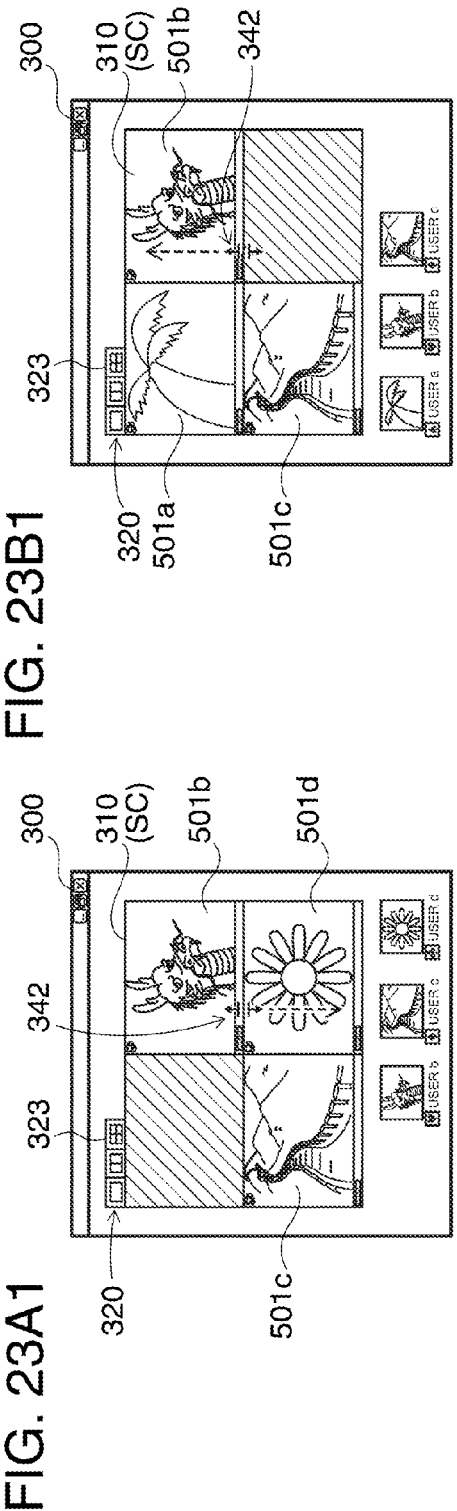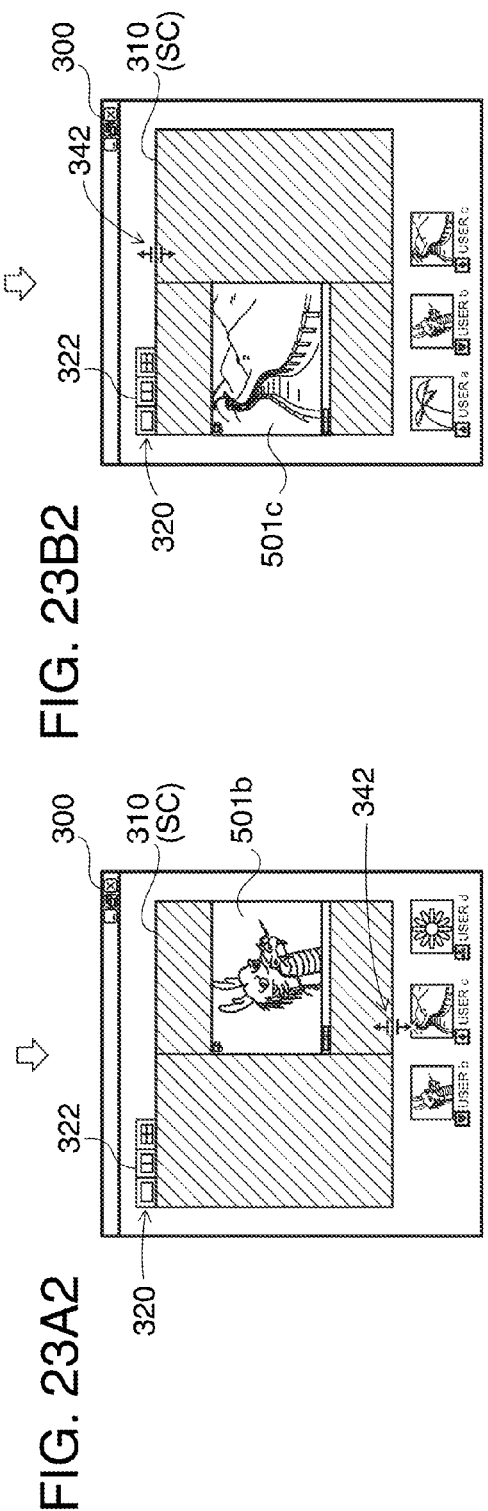

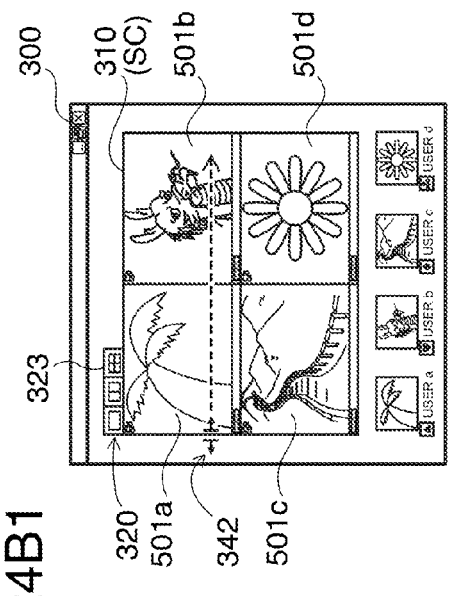
FIG. 24A1
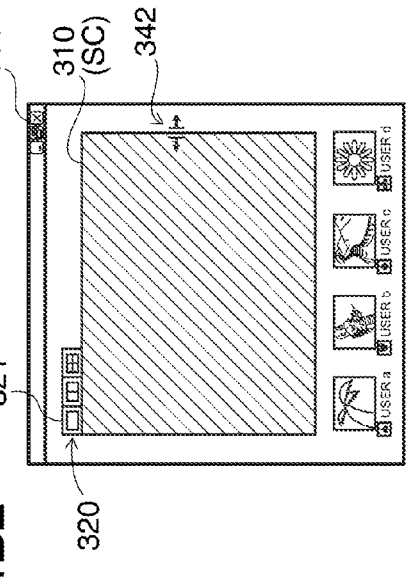
FIG. 24A2
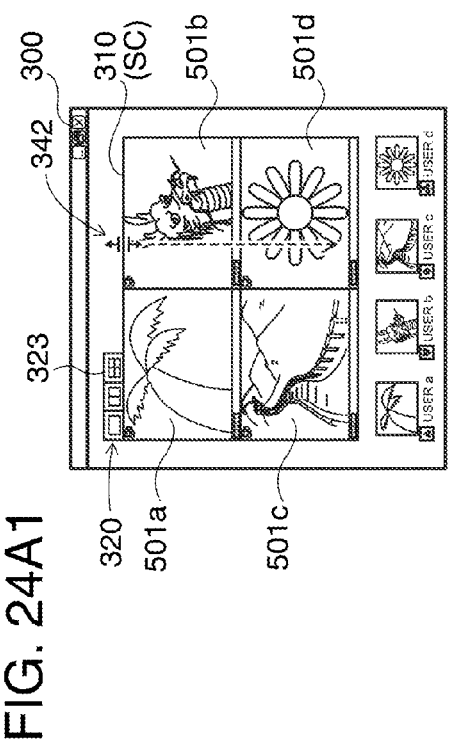
FIG. 24B1
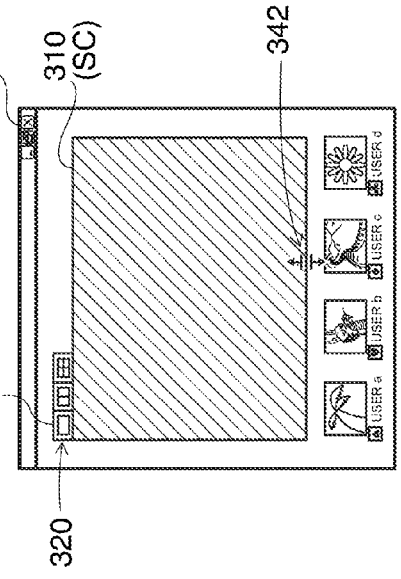
FIG. 24B2

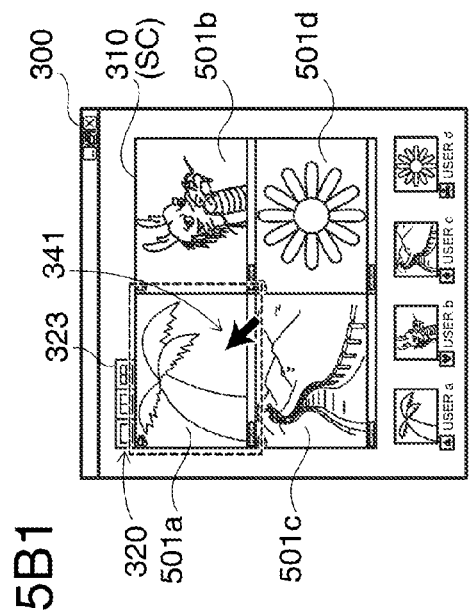
FIG. 25A1
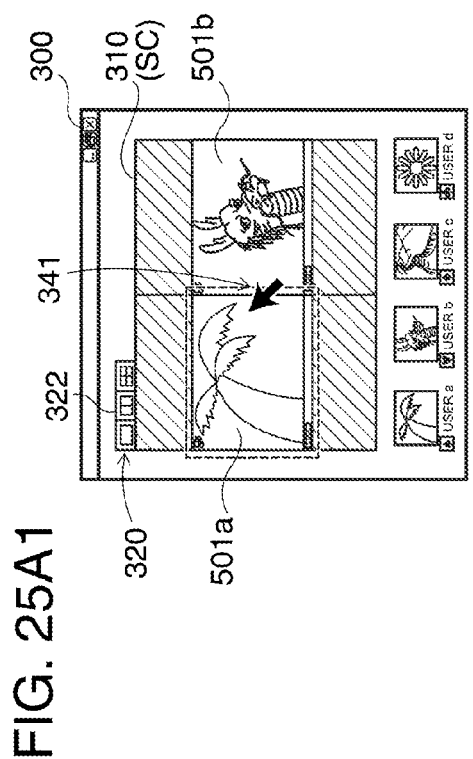
FIG. 25A2
FIG. 25B1
FIG. 25B2

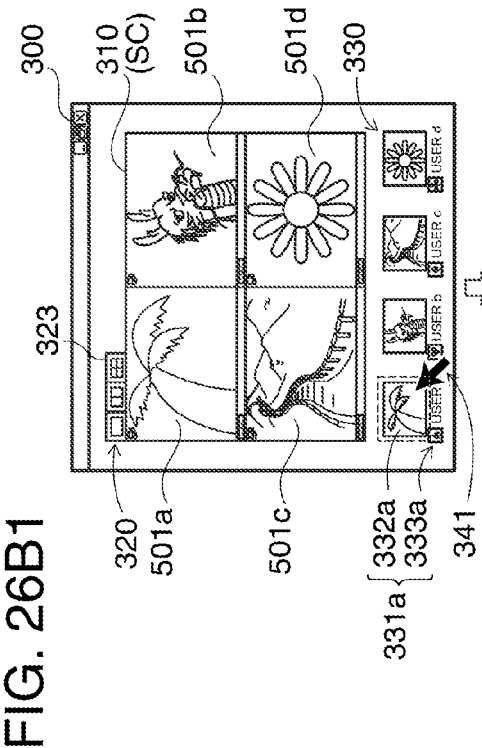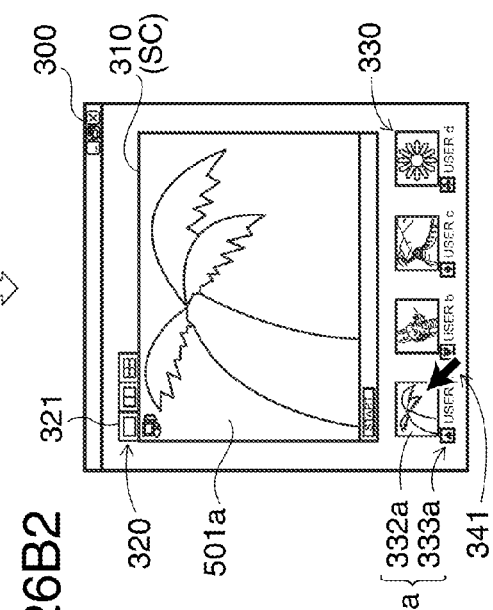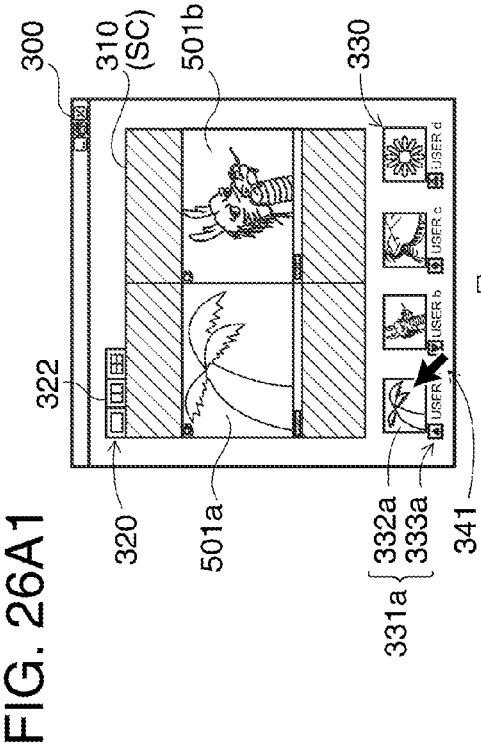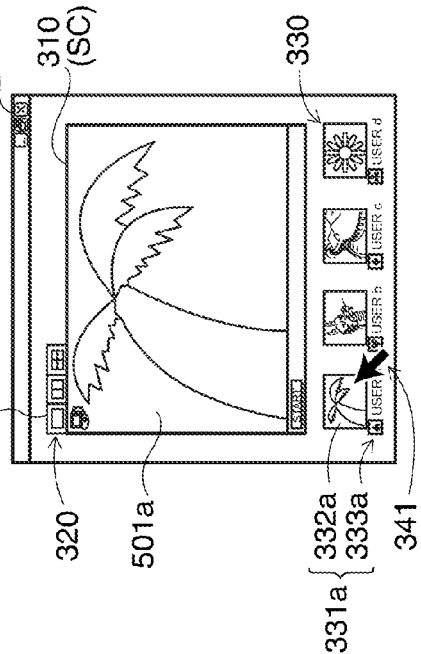

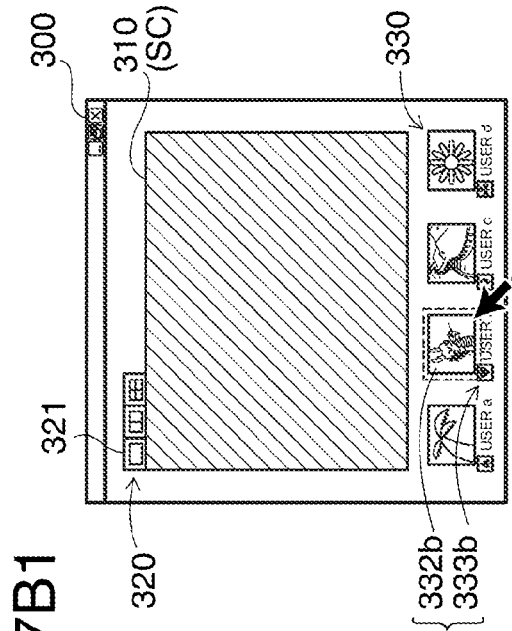
FIG. 27A1
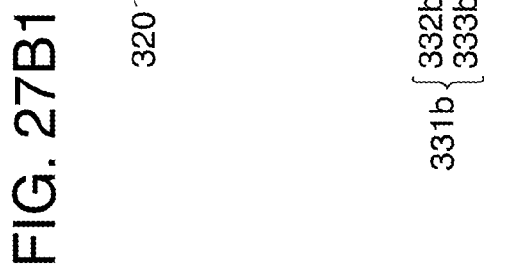
FIG. 27B1
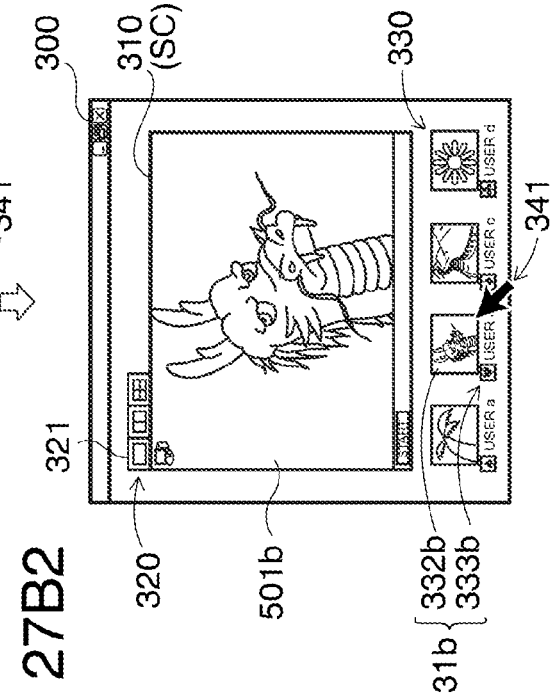
FIG. 27A2
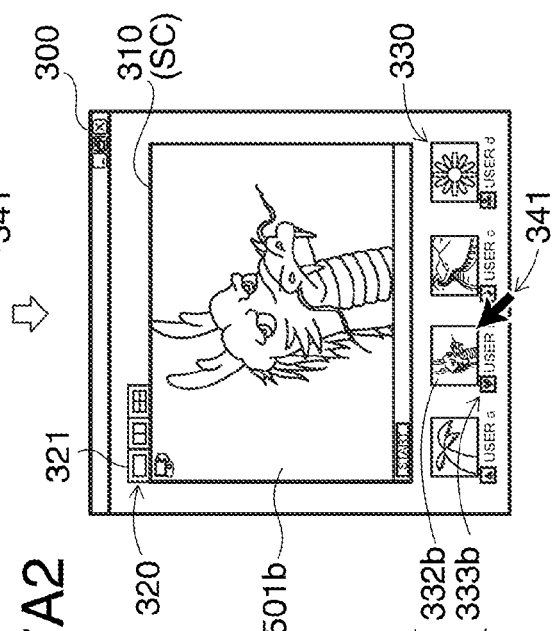
FIG. 27B2

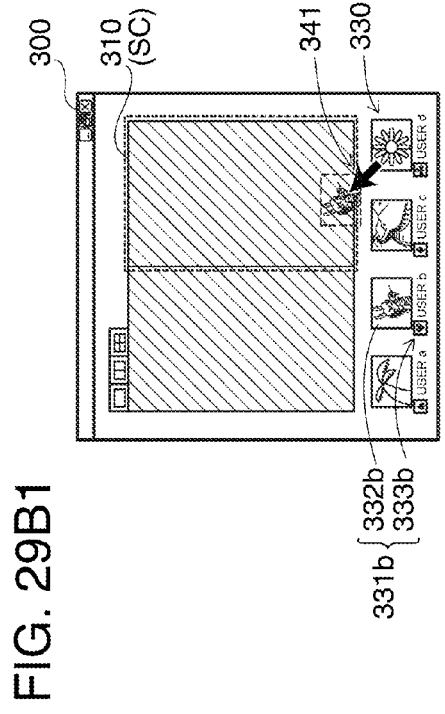
FIG. 29A1
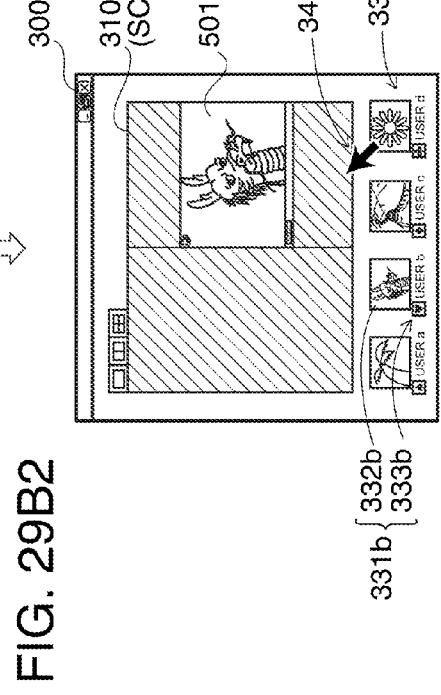
FIG. 29B1
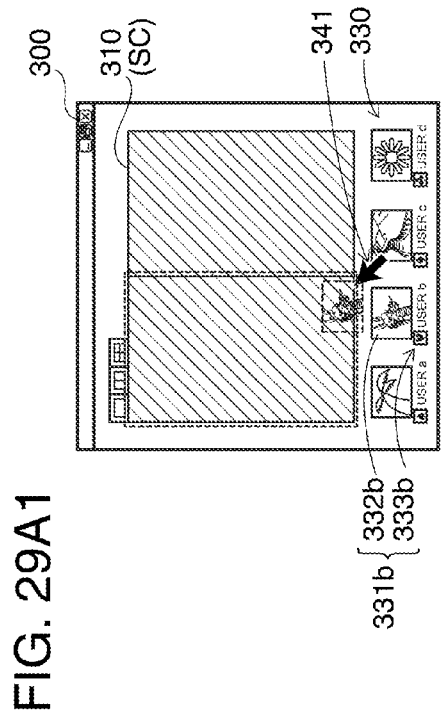
FIG. 29A2
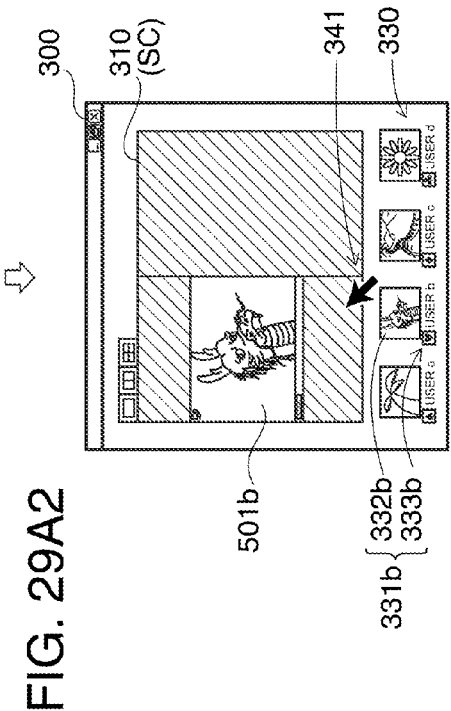
FIG. 29B2

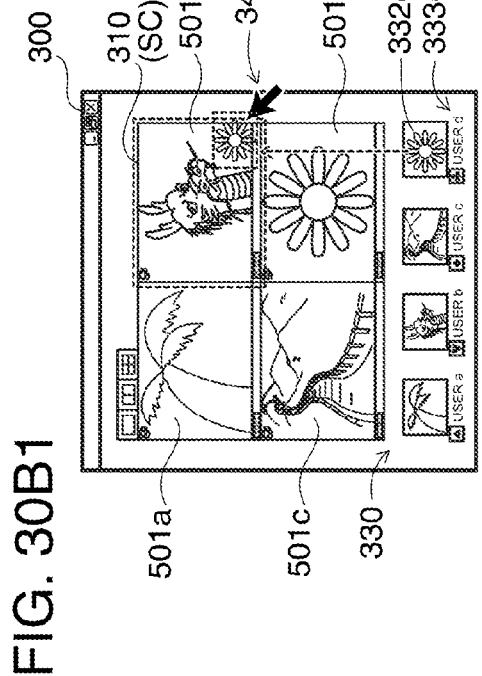
FIG. 30A1
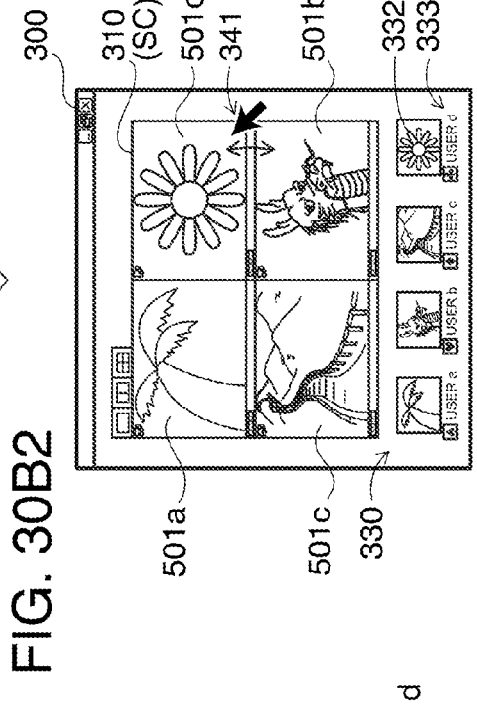
FIG. 30B1
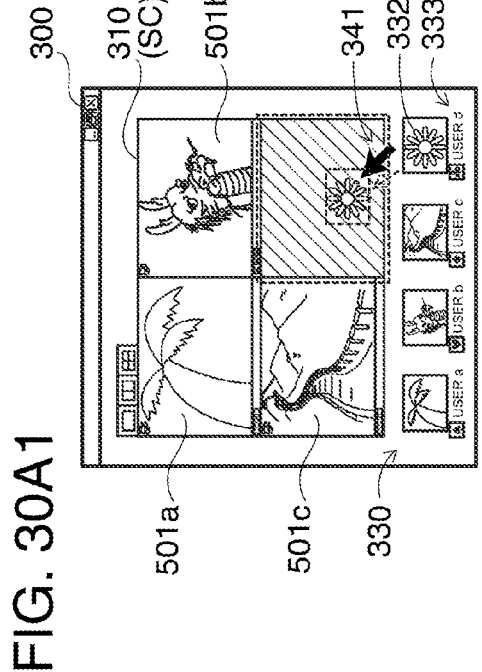
FIG. 30A2
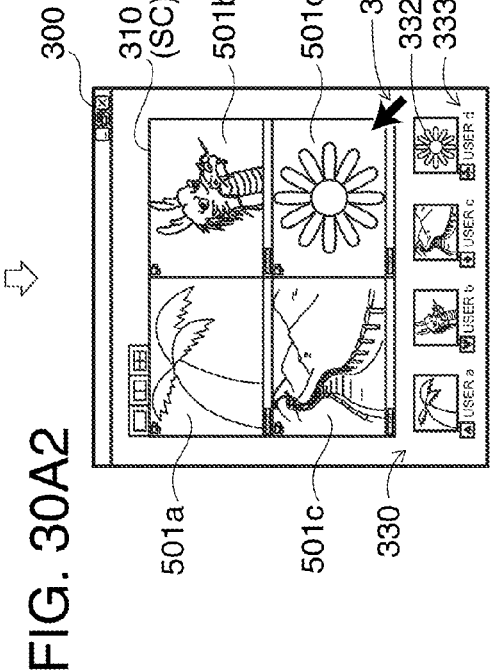
FIG. 30B2

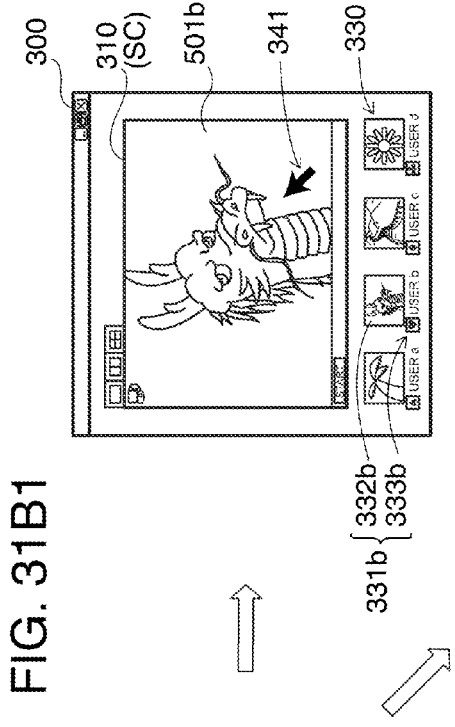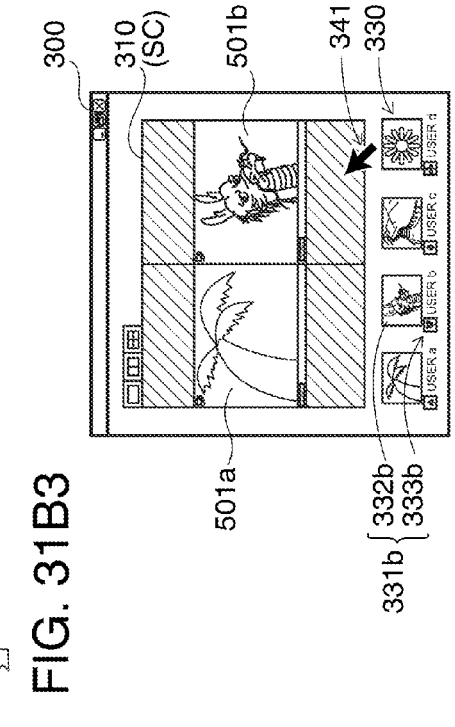
FIG. 31A
FIG. 31B1
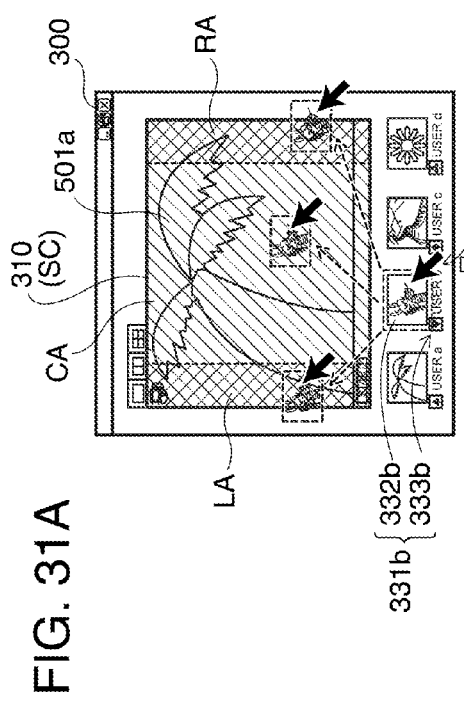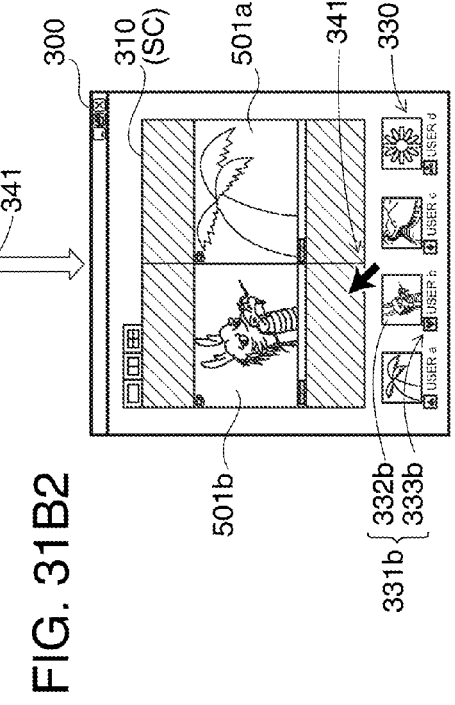
FIG. 31B2
FIG. 31B3

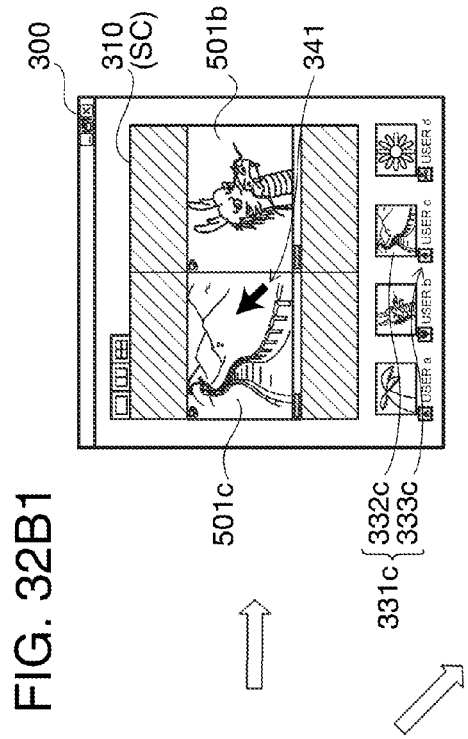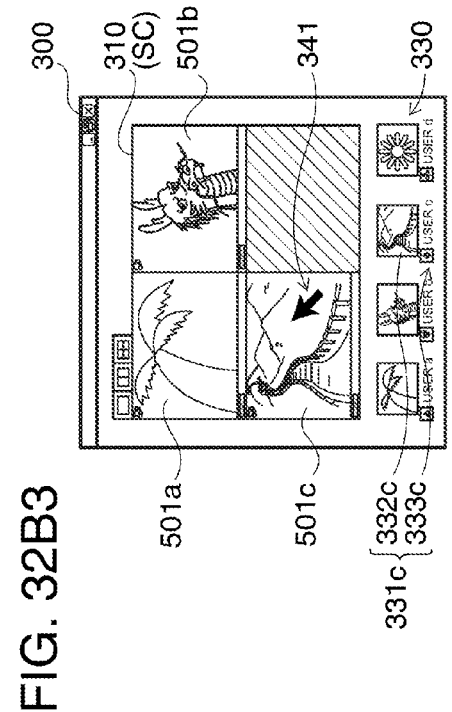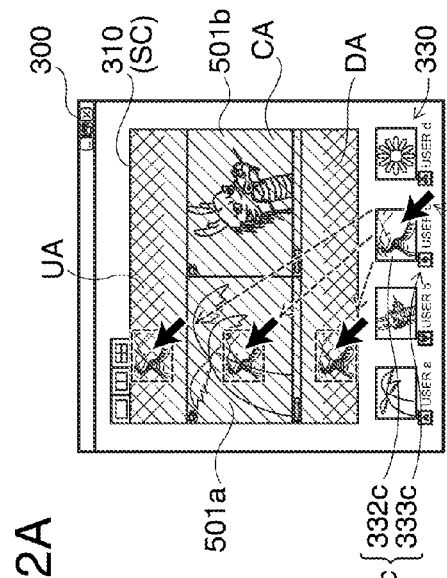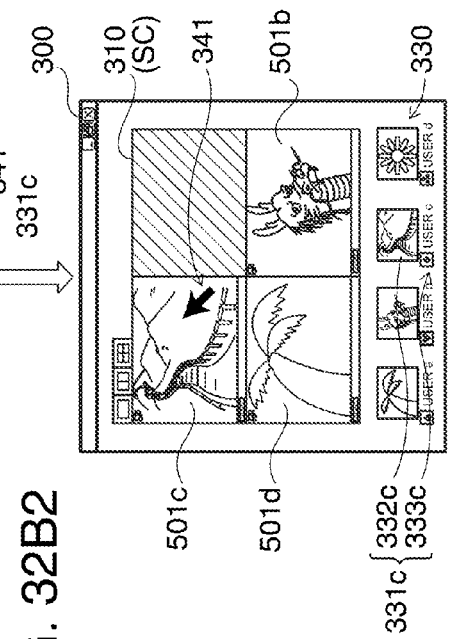
FIG. 32A  FIG. 32B1  FIG. 32B2  FIG. 32B3

IMAGE DISPLAY SYSTEM, IMAGE DISPLAY DEVICE, AND IMAGE DISPLAY METHOD

CROSS-REFERENCE

The present application claims priority from Japanese Patent Application No. 2009-129922 filed on May 29, 2009, which is hereby incorporated by reference in its entirety.

BACKGROUND

In presentations, conferences, or the like, in some cases, there is used an image display system capable of displaying a display screen of a terminal such as a personal computer operated by each of a plurality of participants on a common screen area, which can be viewed by all of the participants. In International Patent publication WO2005/088602, there is proposed a technology of dividing the projection screen into a plurality of image areas, and arranging the images transmitted from a plurality of image generation devices to an image projection device to the respective image areas thus divided to thereby project the respective images at the same time. Japanese Patent No. 4010198 is another example of a related art document.

Incidentally, in presentations or conferences, in general, roles of the participants are replaced with each other flexibly such as a presenter and a speaker changed in a rotating manner. Therefore, in the case in which the display screens of the terminals of the respective participants are displayed on the common screen area thus divided, it is preferable in terms of effective presentation and invigoration of discussion that the operation of changing the layout of the common screen area can be performed efficiently. However, it is very much a situation in which a sufficient devise has not ever been provided to improvement of the convenience of such an image display system.

SUMMARY

Various embodiments may provide a technology of improving convenience on the operation of changing display contents of a screen in an image display system for arranging supplied images transmitted from a plurality of image supply devices on a common screen area and then displaying them thereon.

Application Example 1

According to at least one embodiment of the disclosure, there is provided an image display system having a common screen area allowing a plurality of users to view a common image, including a plurality of image supply devices each having an image display section, and an image transmission section adapted to generate a supply image using an image displayed in the image display section and to externally transmit the supply image, and an image display device capable of dividing the common screen area into one or more screen areas, and of displaying the supply image supplied from each of the plurality of image supply devices in the one or more screen areas, wherein each of the image supply devices displays a common screen area operating image allowing the user to operate a display state of the common screen area in the image display section, and supplies a display image of the image display section to the image display device as the supply image, and the image display device changes the display state of the common screen area in accordance with an operation by the user in each of the image supply devices via the common screen area operating image.

According to the image display system of this embodiment, each of the users of the respective image supply devices can change the display content of the common screen area via the common screen area operating image. Therefore, since each of the users can arbitrarily change the display content of the common screen area, convenience for each of the users can be improved. Further, although the supply image generated using the display image in each of the image supply devices is displayed on the common screen area, the supply image does not include the common screen area operating image. Therefore, since each of the users can display only a desired image on the common screen area, convenience for the each user is further improved.

Application Example 2

The image display system according to the application example 1, wherein the common screen area operating image includes a layout image having divisional layout frames showing a configuration of one or more screen areas in the common screen area, the divisional layout frames can be changed by an operation by the user on the common screen area operating image, and the image display device performs display after changing a configuration of the one or more screen areas in the common screen area in accordance with the change of the divisional layout frames.

According to the image display system of this embodiment, since each of the users can arbitrarily change the screen configuration of the common screen area, convenience for each of the users can be improved.

Application Example 3

The image display system according to the application example 2, wherein the image display device generates new divisional layout frames in response to the user performing an operation of dragging a boundary between the divisional layout frames into an area in the layout frame on the common screen area operating image, and the image display device deletes the divisional layout frames in response to the user performing an operation of dragging the boundary existing between the divisional layout frames out of the layout image on the common screen area operating image.

According to the image display system of this embodiment, each of the user can increase or decrease the divisional layout frames by dragging the boundary between the divisional layout frames on the common screen area operating image. Therefore, since each of the users can arbitrarily change the display layout of the common screen area, convenience for each of the users can be improved.

Application Example 4

The image display system of any one of the application examples 2 and 3, wherein the common screen area operating image has an identification image list area adapted to display a list of identification images for identifying the supply images supplied from the image supply devices, and the image display device displays the supply image identified by the identification image selected by the user in the identification image list area on the common screen area operating image.

According to the image display system of this embodiment, by arbitrarily selecting the identification image representing the supply image in the identification image list area on the common screen area operating image, each of the users can display the supply image in the common screen area. Therefore, since each of the users can arbitrarily change the display state of the common screen area, convenience for each of the users can be improved.

Application Example 5

The image display system of the application example 4, wherein the image display device displays the supply image identified by the identification image in the screen area in the common screen area corresponding to the divisional layout frame in which the identification image is dragged and dropped when the user drags and drops the identification image selected from the identification image list area in the divisional layout frame.

According to the image display system of this embodiment, by dragging and dropping the identification images representing the respective supply images on the common screen area operating image, the user can change the layout of the supply images in the common screen area. Therefore, since each of the users can arbitrarily change the display layout of the common screen area, convenience for each of the users can be improved.

Application Example 6

The image display system of any one of the application examples 4 and 5, the image supply device generates new divisional layout frames for the supply image identified by the identification image in an area corresponding to a position inside the divisional layout frame and shifted toward a circumferential end when the user drags and drops the identification image selected from the identification image list area into the position, and the image display device displays the supply image identified by the identification image in the screen area corresponding to the new divisional layout frame of the common screen area.

According to the image display system of this embodiment, by dragging and dropping the identification images representing the respective supply images on the common screen area operating image, the user can generate the divisional layout frames for the supply images in the common screen area. Therefore, since each of the users can arbitrarily change the display layout of the common screen area, convenience for each of the users can be improved.

Application Example 7

The image display system according to any one of the application examples 1 to 6, wherein the common screen area operating image includes a changeover switch image adapted to switch a division number in the common screen area, and the image display device divides the common screen area into the division number designated by the user with the changeover switch image.

According to the image display system of this embodiment, by operating the changeover switch image on the common screen area operating image, the user can increase or decrease the divisional layout frames in the common screen area. Therefore, since each of the users can arbitrarily change the display layout of the common screen area, convenience for each of the users can be improved.

Application Example 8

According to at least one embodiment of the disclosure, there is provided an image display method in an image display system capable of displaying supply images respectively supplied from a plurality of image supply devices on a common screen area divided into one or more screen areas via an image display device, the method including (a) displaying common screen area operating image for a user to operate a divisional state of the common screen area in each of image display sections of the image supply devices, (b) generating the supply image using an image displayed in the image display section in each of the image supply devices, and supplying the image display device with the supply image, and (c) changing the display state of the common screen area in the image display device in accordance with an operation by the user in each of the image supply devices via the common screen area operating image.

According to this embodiment, each of the users of the respective image supply devices can change the display content of the common screen area via the common screen area operating image. Therefore, since each of the users can arbitrarily change the display content of the common screen area, convenience for each of the users can be improved. Further, although the supply image generated using the display image in each of the image supply devices is displayed on the common screen area, the supply image does not include the common screen area operating image. Therefore, since each of the users can display only a desired image on the common screen area, convenience for the each user is further improved.

Application Example 9

According to at least one embodiment of the disclosure, there is provided an image display device capable of displaying supply images from a plurality of image supply devices each having an image display section and an image transmission section adapted to generate a supply image using an image displayed in the image display section and to externally transmit the supply image on a common screen area allowing a plurality of users to view a common image, the image display device changes a display state of the common screen area in response to an operation of the user via a common screen area operating image displayed in each of the image display sections of the respective image supply devices, and divides the common screen area into one or more screen areas to display a display image of the image display section.

According to this embodiment, the image displayed on the common screen area does not include the common screen area operating image. Therefore, since each of the users can display only a desired image on the common screen area, convenience for the each user is further improved.

It should be noted that the embodiments can be realized in various forms, such as an image display system (an image display device) and an image display method, a computer program for realizing the method or a function of the system thereof, or a recording medium or the like storing the computer program.

BRIEF DESCRIPTION OF THE DRAWINGS

Non-limiting and non-exhaustive embodiments of the present disclosure will be described with reference to the accompanying drawings, wherein like reference numbers reference like elements.

FIGS. 11A through 11C are explanatory diagrams for explaining switching of a display layout mode in the projection screen using a display mode switching button of the operation window.

FIGS. 12A1, 12A2, 12B1 and 12B2 are schematic diagrams for explaining a change in the display layout of the projection screen when the image display device is connected to the image display device.

FIGS. 14A through 14E are schematic diagrams for explaining the operation of changing the display content of the projection screen using the first button of the display mode switching buttons in the operation window.

FIGS. 15A1, 15A2, 15B1, and 15B2 are schematic diagrams for explaining the operation of changing the display content of the projection screen using the first button of the display mode switching buttons in the operation window.

FIGS. 16A1, 16A2, 16B1, and 16B2 are schematic diagrams for explaining the operation of changing the display content of the projection screen using a second button of the display mode switching buttons in the operation window.

FIGS. 17A1, 17A2, 17B1, and 17B2 are schematic diagrams for explaining the operation of changing the display content of the projection screen using a third button of the display mode switching buttons in the operation window.

FIGS. 18A1, 18A2, 18B1, and 18B2 are schematic diagrams for explaining the operation of changing the display content of the projection screen using a slider in the operation window.

FIGS. 19A1, 19A2, 19B1, and 19B2 are schematic diagrams for explaining the operation of changing the display content of the projection screen using the slider in the operation window.

FIGS. 20A1, 20A2, 20B1, and 20B2 are schematic diagrams for explaining the operation of changing the display content of the projection screen using the slider in the operation window.

FIGS. 21A1, 21A2, 21B1, and 21B2 are schematic diagrams for explaining the operation of changing the display content of the projection screen using the slider in the operation window.

FIGS. 22A1, 22A2, 22B1, and 22B2 are schematic diagrams for explaining the operation of changing the display content of the projection screen using the slider in the operation window.

FIGS. 23A1, 23A2, 23B1, and 23B2 are schematic diagrams for explaining the operation of changing the display content of the projection screen using the slider in the operation window.

FIGS. 24A1, 24A2, 24B1, and 24B2 are schematic diagrams for explaining the operation of changing the display content of the projection screen using the slider in the operation window.

FIGS. 25A1, 25A2, 25B1, and 25B2 are schematic diagrams for explaining the operation of changing the display state of the projection screen by an image selection using a pointer in the operation window.

FIGS. 26A1, 26A2, 26B1, and 26B2 are schematic diagrams for explaining the operation of changing the display state of the projection screen by ID image selection using the pointer in the operation window.

FIGS. 27A1, 27A2, 27B1, and 27B2 are schematic diagrams for explaining the operation of changing the display state of the projection screen by the ID image selection using the pointer in the operation window.

FIGS. 29A1, 29A2, 29B1, and 29B2 are schematic diagrams for explaining the operation of changing the display state of the projection screen by drag and drop of the ID image using the pointer in the operation window.

FIGS. 30A1, 30A2, 30B1, and 30B2 are schematic diagrams for explaining the operation of changing the display state of the projection screen by drag and drop of the ID image using the pointer in the operation window.

FIGS. 31A, 31B1, 31B2, and 31B3 are schematic diagrams for explaining the operation of switching the display mode of the projection screen by drag and drop of the ID image using the pointer in the operation window.

FIGS. 32A, 32B1, 32B2, and 31B3 are schematic diagrams for explaining the operation of switching the display mode of the projection screen by drag and drop of the ID image using the pointer in the operation window.

DESCRIPTION OF EMBODIMENTS

A. Embodiment

Figure 1:
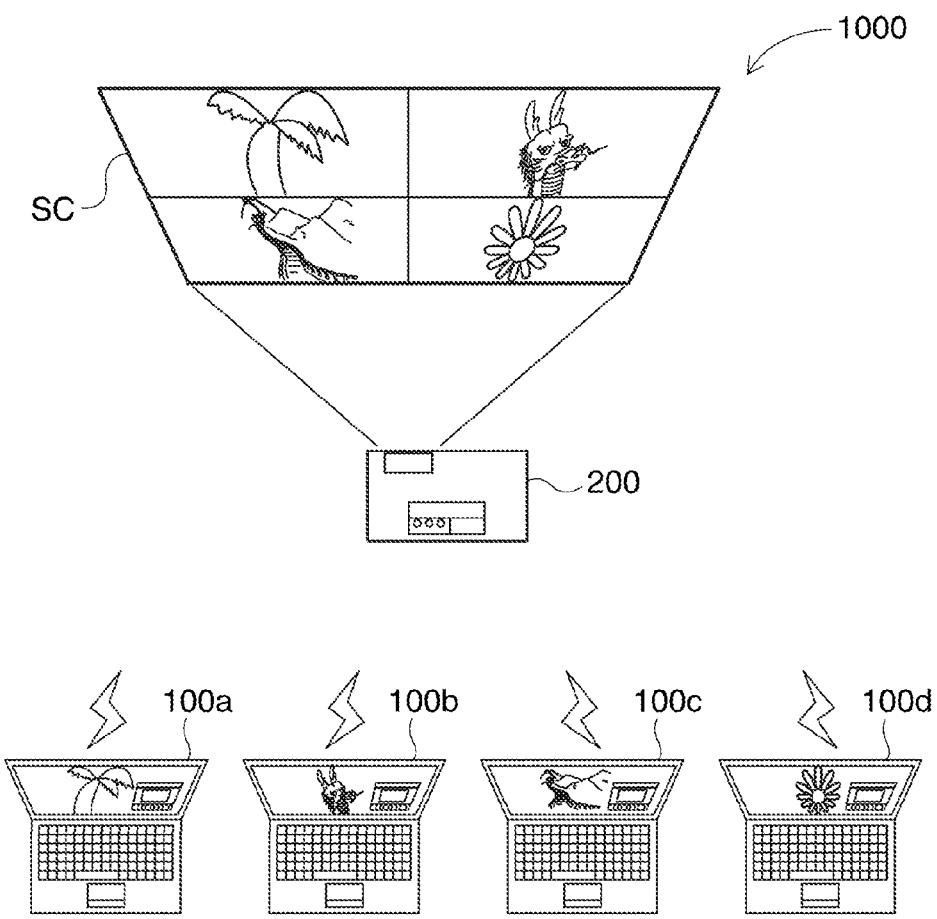
FIG. 1 is a schematic diagram showing a configuration of an image display system.

FIG. 1 is a schematic diagram showing a configuration of an image display system as an embodiment of the invention. The image display system 1000 is provided with four image supply devices 100a through 100d, an image display device 200, and a projection screen SC. The four image supply devices 100a through 100d each can be connected to the image display device 200 via a local area network (LAN). Each of the image supply devices 100a through 100d establishes connection with the image display device 200, and then transmits a supply image, which is generated using a display image the image supply device itself keeps displaying such as a desktop image, to the image display device 200. The image display device 200 is capable of arranging the images supplied from the respective image supply devices 100a through 100d on divisions of the projection screen SC and displaying them simultaneously.

The image display system 1000 can be used in scenes such as conferences and presentations, where a plurality of participants provides material images previously prepared by the participants and have a discussion with each other. Each of the participants logs in either one of the four image supply devices 100a through 100d, and makes the own material images be projected to and displayed on a common projection screen SC, which can be viewed by all of the participants, via the image display device 200.

Figure 2:
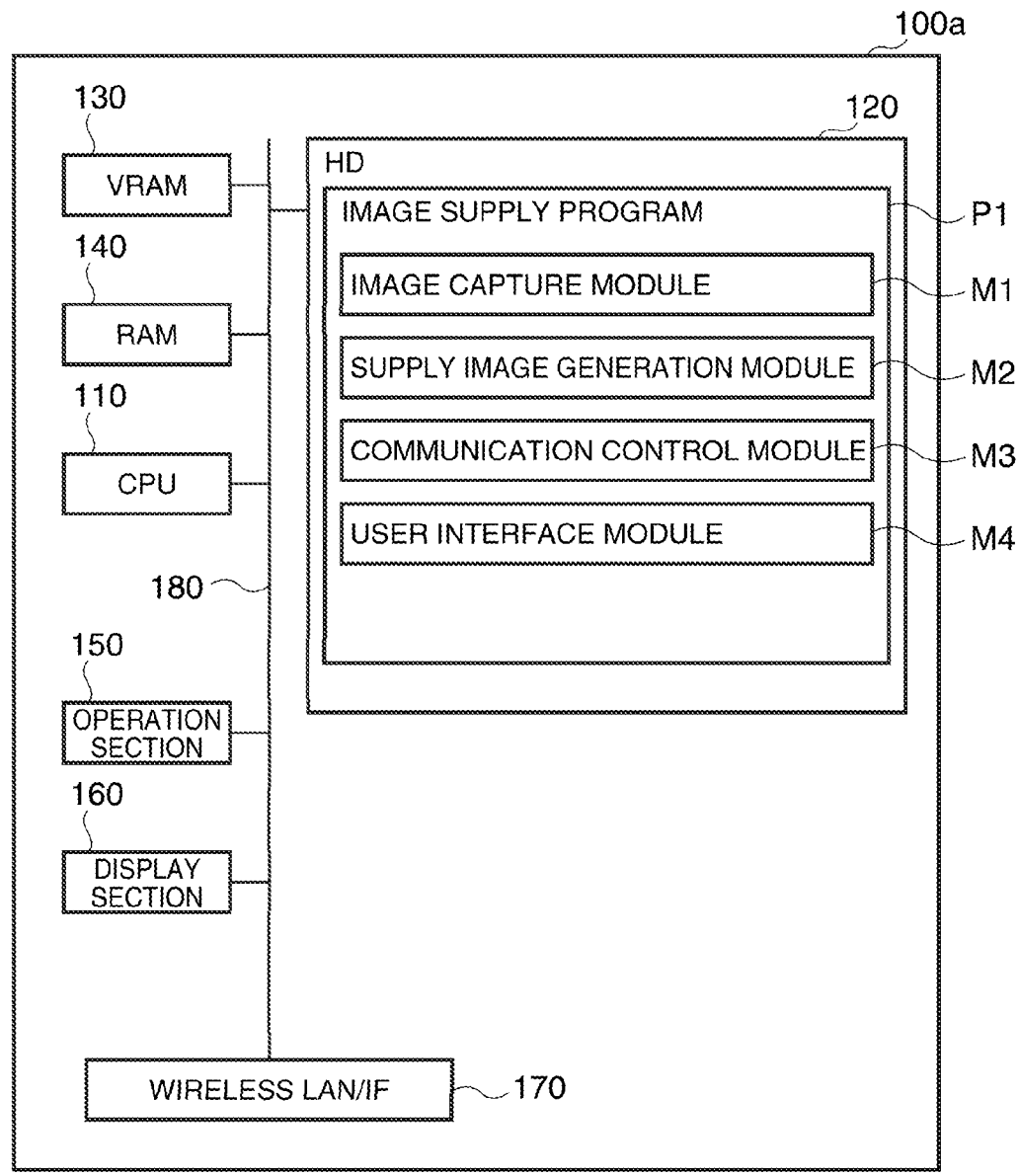
FIG. 2 is a block diagram showing an internal configuration of an image supply device.

FIG. 2 is a block diagram showing an internal configuration of a first image supply device 100a. It should be noted that since the internal configurations of the other image supply devices, namely second through fourth image supply devices 100b through 100d are substantially the same, the illustrations and the explanations thereof will be omitted.

The first image supply device 100a can be configured with, for example, a personal computer or a laptop computer loaded with Windows (registered trademark) as an operating system. Specifically, the first image supply device 100a is provided with a central processing unit (CPU) 110, a hard disk drive (HD) 120, a drawing memory (VRAM) 130, and a random access memory (RAM) 140. Further, the first image supply device 100a is further provided with an operation section 150, a display section 160, and a wireless LAN interface (LAN/IF) 170. These constituents 110 through 170 are connected to each other via a bus 180.

The CPU 110, which is a logic circuit for executing various kinds of arithmetic processing, expands various programs and modules, which are stored in an external storage device such as the HD 120, in the RAM 140 as a primary storage device, and then executes them. The RAM 140 is a volatile memory, and temporarily stores a result of the calculation of the CPU 110, and supply image data to be supplied to the image display device 200 and so on. The VRAM 130 is a memory for expanding and then temporarily buffering the data of the display image drawn based on the data, and is generally capable of reading and writing the data faster than the RAM 140.

The operation section 150 is an interface for receiving an operation of the user of the first image supply device 100a as the participant, and is composed of, for example, a keyboard, a touch pad, and a mouse. The display section 160 is configured with, for example, a liquid crystal display, and displays images based on the contents stored in the VRAM 130. The wireless LAN/IF 170 is an interface for connecting the first image supply device 100a and an external device to each other in a wireless manner. The first image supply device 100a exchanges a signal with the image display device 200 via the wireless LAN/IF 170.

The HD 120 stores an image supply program P1. The image supply program P1 generates the supply image data to be supplied to the image display device 200 and transmits it thereto, and at the same time, provides the participant as the user with an interface for performing an operation of changing the display state of the projection screen SC. The image supply program P1 has an image capture module M1, a supply image generation module M2, a communication control module M3, and a user interface module M4.

The image capture module M1 captures the display image of the display section 160. In other words, the image capture module M1 obtains data of an image displayed on the display section 160 from the VRAM 130. The supply image generation module M2 generates the supply image data to be supplied to the image display device 200 using the image data obtained by the image capture module M1. Specific contents of the supply image data and a generation method thereof will be described later.

The communication control module M3 controls the wireless LAN/IF 170 to control communication with the image display device 200. Specifically, the communication control module M3 obtains model information of the image display device 200, and then establishes the connection with the image display device 200. Here, the "model information of the image display device 200" includes identification information for identifying the image display device 200 and information (e.g., the maximum resolution with which an image can be displayed and a color profile) related to the image reproduction characteristic of the image display device 200. Further, the communication control module M3 transmits the supply image data generated by the supply image generation module M2 to the image display device 200.

The user interface module M4 displays an operation window (described later), an image used for a user interface, on the display section 160, and receives instructions of the user via the operation window. The communication control module M3 transmits the instruction of the user, which has been received by the user interface module M4, to the image display device 200. Further, the user interface module M4 obtains update information (described later) of the operation window transmitted from the image display device 200, and at the same time, updates the display content of the operation window.

Figure 3:
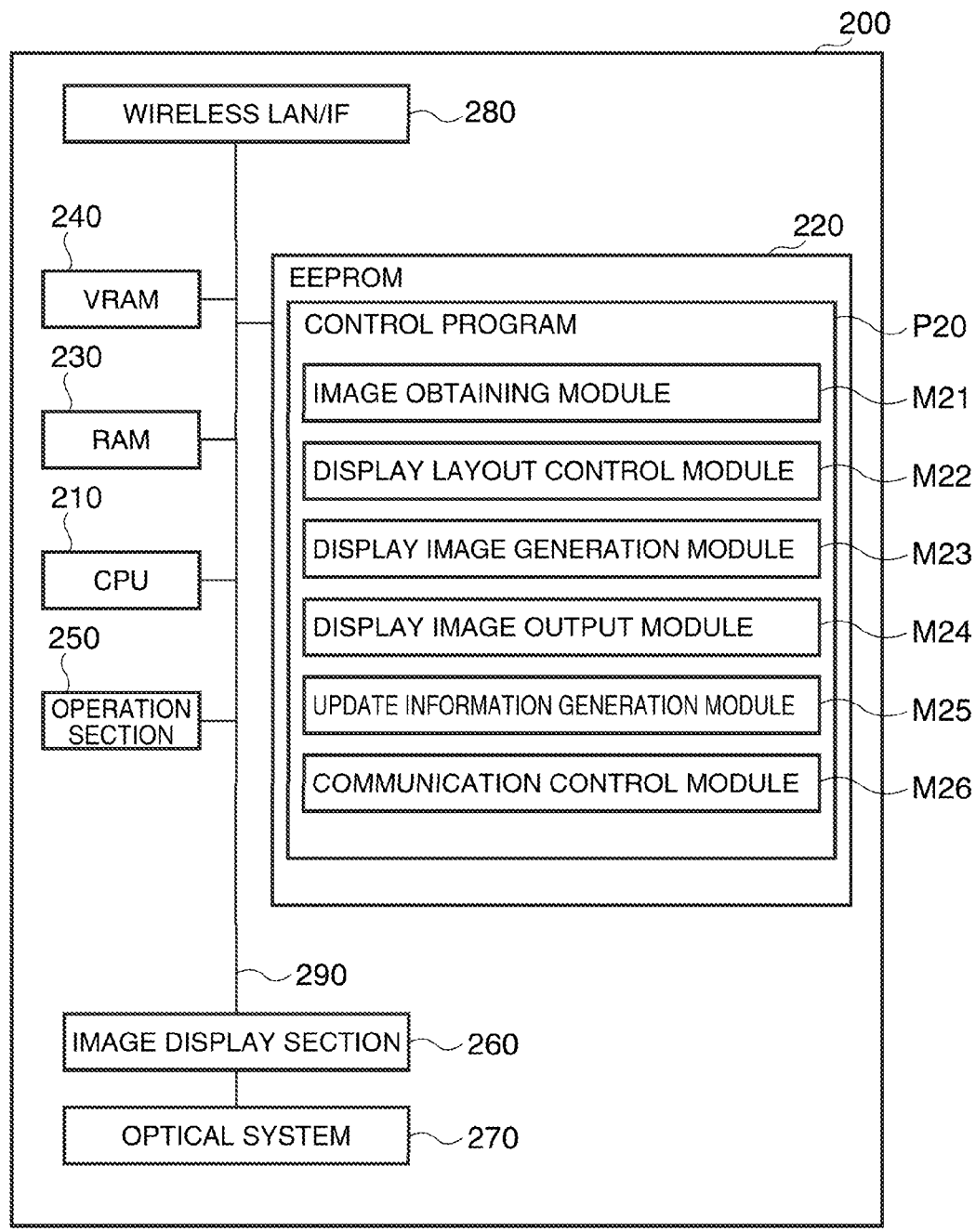
FIG. 3 is a block diagram showing an internal configuration of an image display device.

FIG. 3 is a block diagram showing an internal configuration of the image display device 200. The image display device 200 is a projector and is provided with a CPU 210, an EEPROM 220 as a nonvolatile memory, a RAM 230, a VRAM 240, an operation section 250, an image display section 260, an optical system 270, and a wireless LAN/IF 280. These constituents 210 through 280 are connected to each other via a bus 290.

The CPU 210, which is a logic circuit for executing various kinds of arithmetic processing, expands various programs and modules, which are stored in, for example, the EEPROM 220, in the RAM 230, and then executes them. The RAM 230 temporarily stores a result of calculation by the CPU 210. The VRAM 240 temporarily buffers drawing data (e.g., data of pixel values arranged by the bitmap method) generated based on the display image data. The operation section 250 is composed of an operation button, a touch panel, and so on, and receives various operations related to the image display device 200 such as control of the display state including zooming and focusing of the projection image.

The image display section 260 modulates light emitted from an RGB light source based on the drawing data stored in the VRAM 240 using liquid crystal panels or digital micro mirror devices (DMD) to thereby generate an image for projection. The optical system 270 is composed of a plurality lenses, and projects the image generated by the image display section 260 on the projection screen SC with the size and the focus thereof adjusted. The wireless LAN/IF 280 is an interface for connecting the image display device 200 and an external device to each other in a wireless manner. The image display device 200 exchanges the signals with each of the image supply device 100a through 100d via the wireless LAN/IF 280.

The EEPROM 220 stores a control program P20 for controlling the image display device 200. The control program P20 has an image obtaining module M21, a display layout control module M22, a display image generation module M23, a display image output module M24, an update information generation module M25, and a communication control module M26.

The image obtaining module M21 obtains the supply image data supplied from each of the image supply devices 100a through 100d. The display layout control module M22 changes the settings of the display layout of the supply images on the projection screen SC along the instruction of the user transmitted from each of the image supply devices 100a through 100d. The display image generation module M23 generates image data (display image data) for projection obtained by arranging the supply image supplied from the respective image supply devices 100a through 100d along the settings of the display layout by the display layout control module M22. The display image output module M24 generates the drawing data based on the display image data, and then stores it in the VRAM 240.

The update information generation module M25 generates the update information for updating the display content of the operation window in each of the image supply devices 100a through 100d. The communication control module M26 controls the wireless LAN/IF 280 to control communication with each of the image supply devices 100a through 100d. Specifically, the communication control module M26 executes a process for establishing a communication channel for, for example, transmission of the model information, reception of the supply image, delivery of the update information, and so on.

Figure 4:
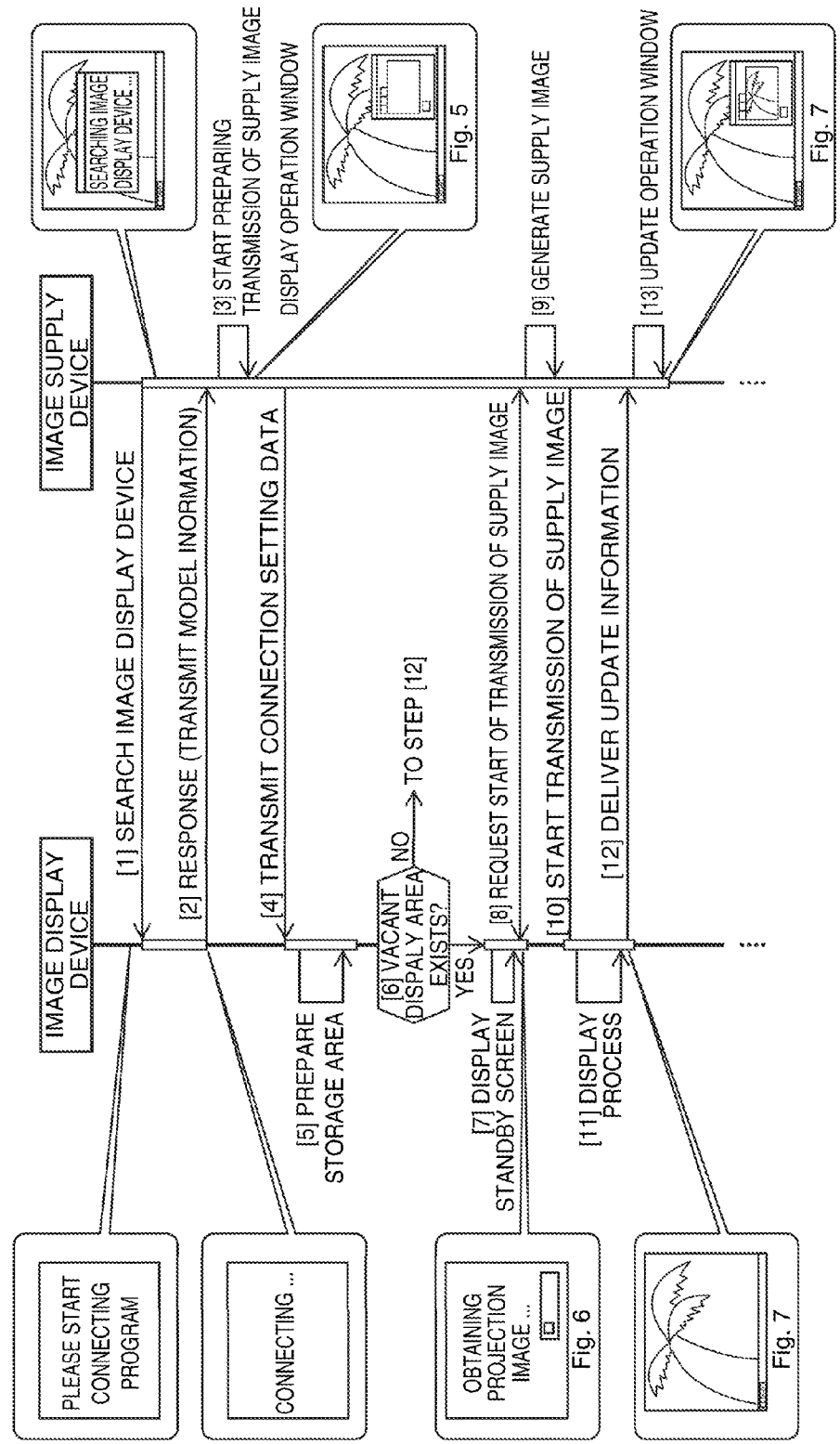
FIG. 4 is an explanatory diagram for explaining communication for establishing connection between the image supply device and the image display device.

FIG. 4 is a sequence diagram for explaining the communication for establishing the connection between each of the image supply devices 100a through 100d and the image display device 200. In this diagram, the processing procedure of each of the image supply devices 100a through 100d is shown on the right as one faces the sheet of the drawing in a single line without separating the image supply devices 100a through 100d into individuals. Firstly, the communication in the case in which the first image supply device 100a is connected first to the image display device 200 will be explained. It should be noted that in the drawing the transition of the display image of the projection screen SC is illustrated on the left as one faces the sheet of the drawing in a time-series manner, and the transition of the display screen of the first image supply device 100a is illustrated on the right thereof in a time series manner.

The image display device 200 keeps displaying a message, which prompts to start the image supply program P1 to start supplying an image, on the projection screen SC in the state in which neither one of the image supply devices 100a through 100d is connected thereto. Here, for example, when a participant of a conference starts the image supply program P1 on the first image supply device 100a, the communication control module M3 of the first image supply device 100a searches the connectable image display device 200, and requires the model information (step [1]). The communication control module M3 keeps displaying a message denoting that a connectable image display device is being searched on the display section 160 until a response from the image display device 200 is obtained successfully.

When having received the request from the first image supply device 100a, the communication control module M26 of the image display device 200 responds thereto, and at the same time, transmits (step [2]) the model information in response to the request from the first image supply device 100a. It should be noted that in this case the image display device 200 displays a message denoting that the connection with the first image supply device 100a is under establishment on the projection screen SC.

When receiving the model information, the communication control module M3 of the first image supply device 100a transmits the information related to the image reproduction characteristic of the image display device 200 included in the model information to the supply image generation module M2. The supply image generation module M2 starts preparation for generating the supply image with a standard based on the information thus transmitted. Further, the communication control module M3 performs setting and preparation for transmission of the supply image (step [3]). Further, in this case, the user interface module M4 displays the operation window on the display section 16.

Figure 5A:
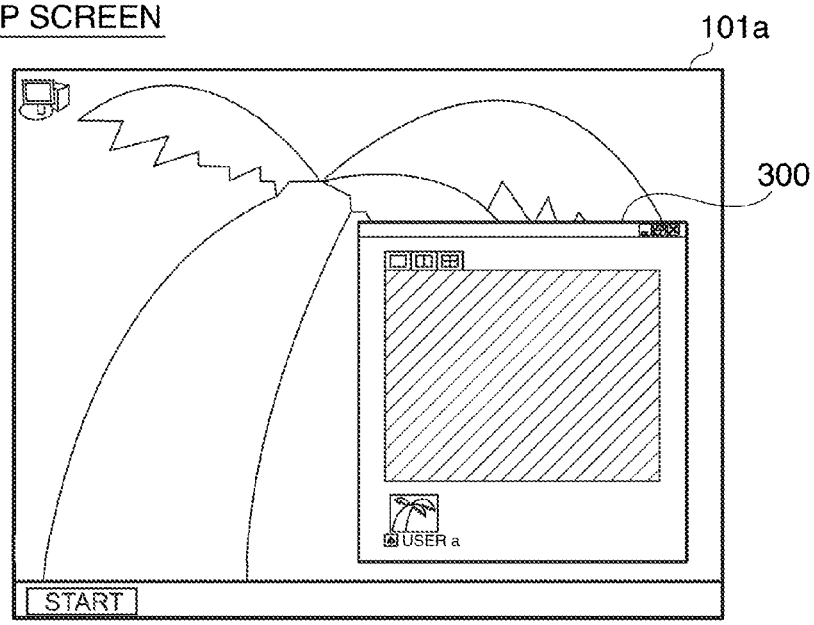
FIGS. 5A and 5B are explanatory diagrams for explaining an operation window.
Figure 5B:
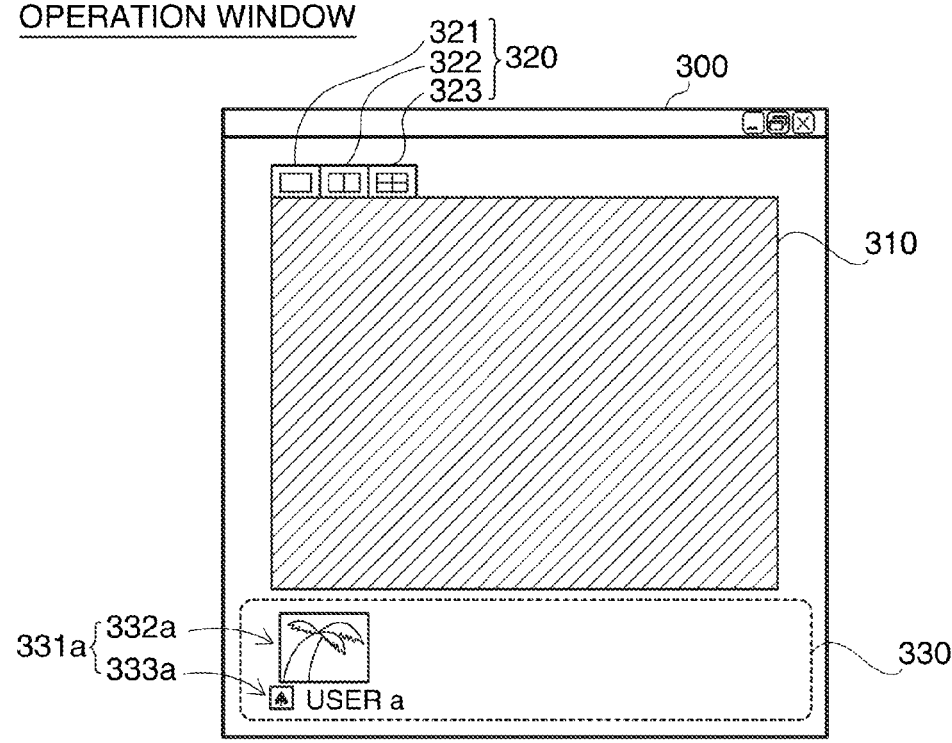

FIGS. 5A and 5B are explanatory diagrams for explaining the operation window. FIG. 5A is a schematic diagram showing an example of the display screen of the display section 160 in the first image supply device 100a on which the operation window 300 is displayed. In this example, there is displayed a desktop screen 101a, and a wallpaper, a desktop icon, a taskbar, and so on are displayed on the desktop screen 101a besides the operation window 300. It should be noted that also in the case in which a screen of an application program such as a presentation program is displayed on the first image supply device 100a, the operation window 300 is displayed on the screen of the application program at the start-up of the operation window 300.

FIG. 5B is a schematic diagram showing only the operation window 300 in an enlarged manner. The operation window 300 includes a screen image 310 and display mode switching buttons 320. The screen image 310 is an image obtained by shrinking the display image of the projection screen SC. The screen image 310 reflects the display content of the projection screen SC in real time due to the communication between the image display device 200 and each of the image supply devices 100a through 100d connected thereto. It should be noted that since the supply image from the outside is not displayed on the projection screen SC at this moment, the drawing shows that the projection screen SC is in the nondisplay state by providing hatching to the screen image 310.

The display mode switching buttons 320 are components the user can operate via the operation section 150, and are buttons for switching the mode of the display layout of the supply images in the projection screen SC. The display mode switching buttons 320 is composed of three buttons 321, 322, and 323 corresponding to the modes of the display layout. The details of the display mode switching buttons 320 and the modes of the display layout will be described later.

The operation window 300 is further provided with an ID image display area 330 (illustrated in the drawing with the broken line) for displaying the ID images for identifying the image supply device connected to the image display device 200 and the user as a list. The ID image is an image generated by the user interface module M4 in each of the image supply devices 100a through 100d. The ID image includes a supply image thumbnail as a thumbnail image of the supply image, and a user identification image for identifying the user to be provided with the supply image.

The supply image thumbnail is an image generated in each of the image supply devices 100a through 100d by shrinking the supply image to the image display device 200. It should be noted that the supply image thumbnail is periodically transmitted to the image display device 200, and the image display device 200 derives the supply image thumbnails thus received to all of the image supply devices connected thereto as the update information of the operation window 300. Thus, the supply image thumbnail of the operation window 300 becomes synchronized with the display content of the supply image. The user identification image is an image generated in each of the image supply devices 100a through 100d based on the user information such as a user icon and a user name the user has previously registered. It should be noted that in the drawing the supply image thumbnail 332a and a user identification image 333a representing the participant (assumed to be a "user a") logging in the first image supply device 100a are displayed in the ID image display area 330 as the ID image 331a of the first image supply device 100a.

After the operation window 300 is displayed, the communication control module M3 of the first image display device 100a transmits the connection setting data to the image display device 200 (step [4] shown in FIG. 4). Here, the "connection setting data" includes the information for establishing the communication channel, the information used by the image display device 200 for identifying the first image display device 100a, the ID image described above, and so on. The communication control module M26 of the image display device 200 having obtained the connection information prepares the storage area for the first image supply device 100a on the RAM 230 (step [5]).

Subsequently, the display layout control module M22 of the image display device 200 determines whether or not there is a space in an image display area (a layout frame) for displaying the supply image from the first image supply device 100a newly connected thereto (step [6]). Here, since the first image supply device 100a is connected alone to the image display device 200, the display layout control module M22 sets the entire surface of the projection screen SC as the layout frame for the first image supply device 100a.

Subsequently, the communication control module M26 of the image display device 200 displays a standby image including a message, which denotes that acquisition of the image data for projection is in process, on the projection screen SC (step [7]). Then, the communication module M26 transmits a transmission start request for the supply image to the first image supply device 100a (step [8]).

Figure 6:
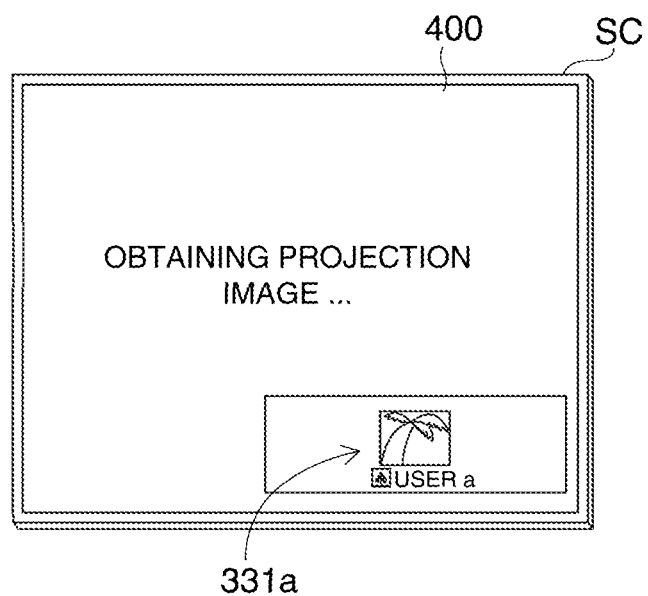
FIG. 6 is a schematic diagram showing a standby image displayed on a projection screen.

FIG. 6 is a schematic diagram showing the standby image displayed on the projection screen in the steps [7] and [8]. In the standby image 400, the ID image of the device requiring transmission of the supply image is displayed together with the message described above. In the drawing, there is displayed the ID image 331a of the first image supply device 100a.

In the step [9] (FIG. 4), the supply image generation module M2 of the first image supply device 100a generates the supply image, and in the step [10] the communication control module M3 starts transmission of the supply image. In the step [11], a projection display process of the supply image is started in the image display device 200.

When the supply image is displayed on the projection screen SC, the update information generation module M25 of the image display device 200 generates the image data of the screen image 310 based on the display image data generated by the display image generation module M23. Then, the update information generation module M25 transmits the image data of the screen image 310 as the update information for the first image supply device 100a (step [12]).

The user interface module M4 of the first image supply device 100a updates the screen image 310 (step [13]) of the operation window 300 (FIG. 5B) using the update information thus received. Thus, the display image of the projection screen SC and the screen image 310 of the operation window 300 are synchronized with each other.

Figure 7A:
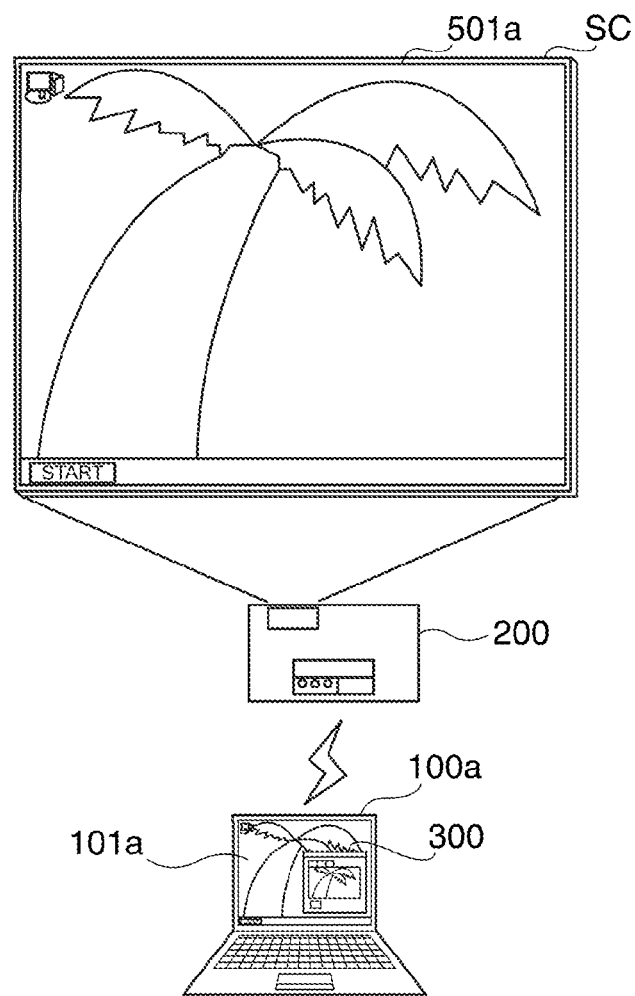
FIGS. 7A and 7B are a schematic diagram showing a state of the image display device projecting a supplied image on a projection screen, and a schematic diagram showing the operation window, respectively.

FIG. 7A is a schematic diagram showing the state in which the image display device 200 keeps projecting the supply image 501a from the first image supply device 100a on the projection screen SC. On the projection screen SC, there is displayed the supply image 501a so as to be arranged in the entire surface thereof. The mode of the display layout for arranging one supply image in the entire projection screen SC is called a "single screen display mode" in the present specification. It should be noted that in the image display device 200 of the present embodiment, the single screen display mode is set as a default mode.

Here, although the operation window 300 is displayed on the display section 160 of the first image supply device 100a, the operation window 300 is not displayed in the supply image 501a displayed on the projection screen SC. This is because the first image supply device 100a generates the supply image 501s so that the operation window 300 is not included therein. Specifically, when capturing the display image on the display section 160, the image capture module M1 treats the operation window 300 as a layer window. Then, the image capture module M1 captures the display image other than the operation window 300 while transmitting the display image through the operation window 300. The supply image generation module M2 generates the supply image 501a using the capture image.

As described above, in the image display system 1000 of the present embodiment, the operation window 300 is not displayed on the projection screen SC. Thus, it is possible to avoid that the material image the user has prepared is put behind the operation window 300 on the projection screen SC, and convenience of the image display system 1000 is improved.

Figure 7B:
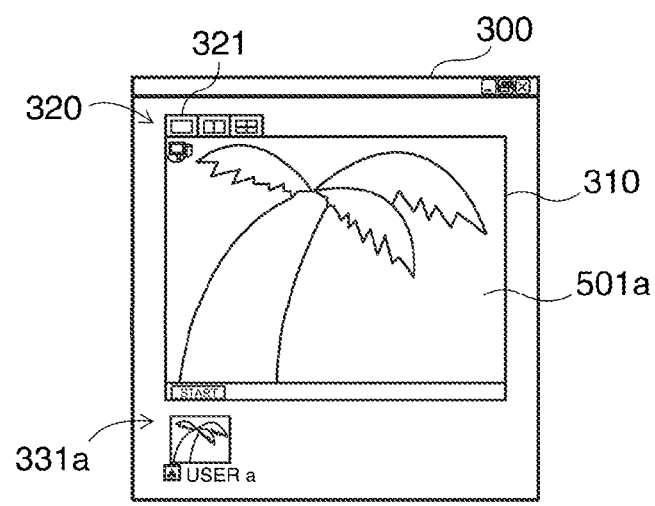

FIG. 7B is a schematic diagram showing the operation window 300 displayed on the first image supply device 100a in an enlarged manner. FIG. 7B is substantially the same as FIG. 5B except the point that the content of the screen image 310 of the operation window 300 is changed. The screen image 310 is synchronized with the display image of the projection screen SC due to the update information delivered from the image display device 200.

Figure 8A:
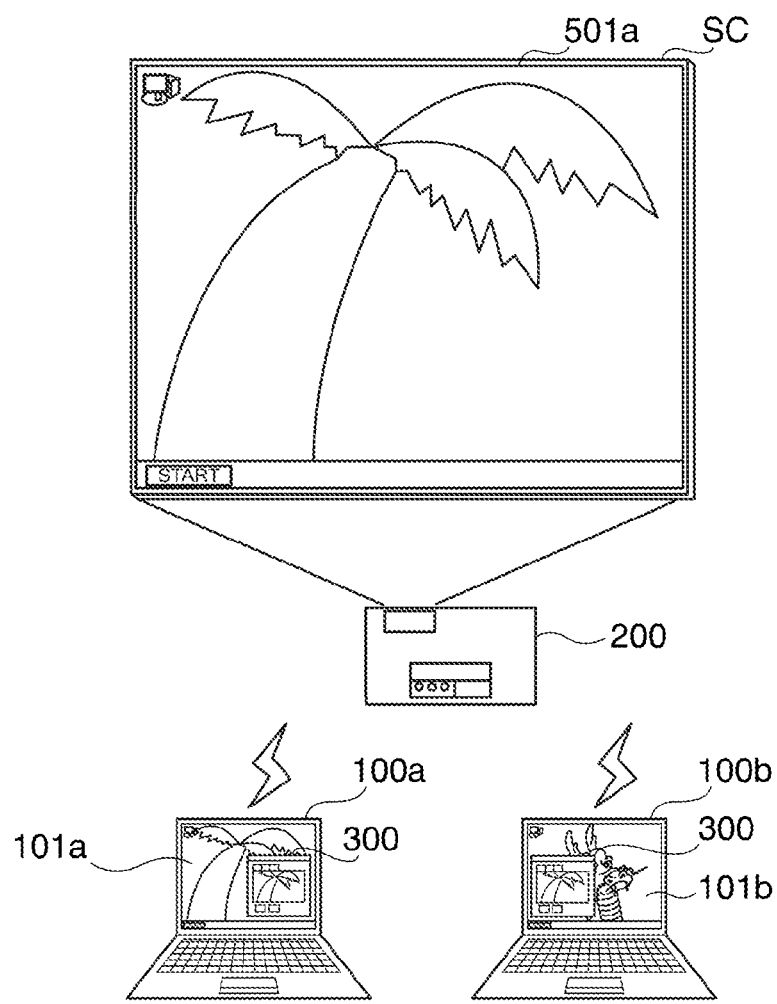
FIGS. 8A and 8B are a schematic diagram showing a state of the image display device projecting a supplied image on a projection screen, and a schematic diagram showing the operation window, respectively.

FIG. 8A is a schematic diagram for explaining the state after the second image supply device 100b is connected to the image display device 200 in addition to the first image supply device 100a. FIG. 8A is substantially the same as FIG. 7A except the point that the second image supply device 100b is added. In the present example, the desktop screen 101b is displayed on the second image display device 100b together with the operation window 300. It should be noted that the participant operating the second image supply device 100b is called a "user b."

The second image supply device 100b is connected to the image display device 200 along the procedure explained with FIG. 4. However, the supply image 501a from the first image supply device 100a has already been arranged in the entire surface of the projection screen SC and displayed thereon. Therefore, since there is no layout frame for displaying the supply image of the second image supply device 100b, the image display device 200 does not execute the steps [7] through [11] and executes the update information delivery process in the step [12] in the process on and after the step [6]. Then, the operation window 300 is updated (step [13]) in the first and second image supply devices 100a, 100b, respectively, using the update information thus delivered. It should be noted that the update information includes the image data for updating the screen image 310 of the operation window 300, and the ID images of all of the image supply devices connected to the image display device 200.

Figure 8B:
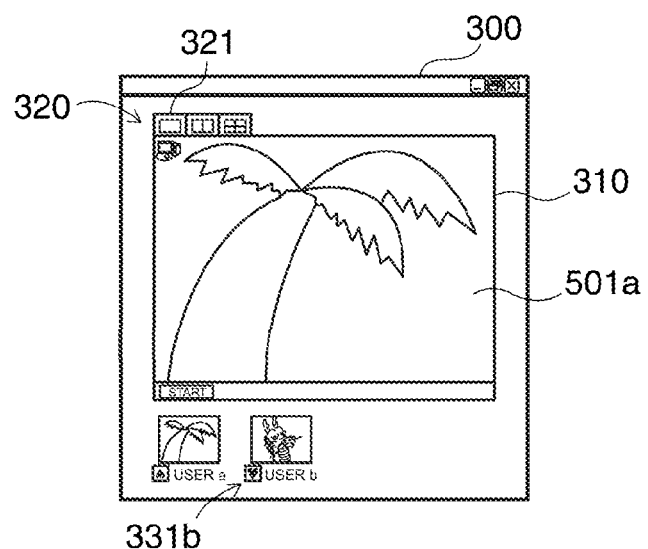

FIG. 8B is a schematic diagram showing the updated operation window 300 displayed on the first and second image supply devices 100a, 100b. FIG. 8B is substantially the same as FIG. 7B except the point that the ID image 331b of the second image supply device 100b is added. When the second image supply device 100b establishes the connection with the image display device 200, the ID image 331b of the second image supply device 100b is additionally displayed in the operation window 300. Thus, the user "a" of the first image supply device 100a can recognize the fact that the user "b," another participant, has newly logged in the image display device 200 via the second image supply device 100b.

Figure 9A:
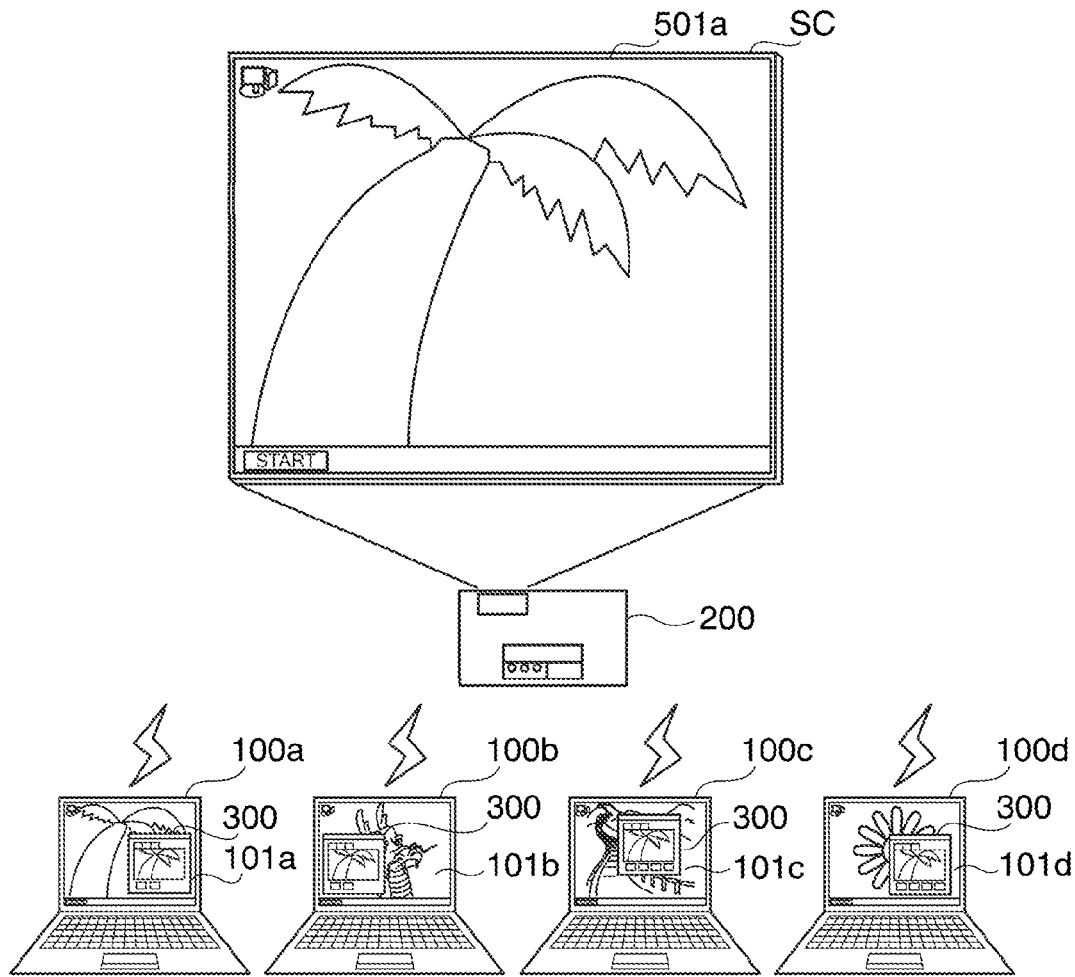
FIGS. 9A and 9B are a schematic diagram showing a state of the image display device projecting a supplied image on a projection screen, and a schematic diagram showing the operation window, respectively.

FIG. 9A is a schematic diagram for explaining the state after each of the third and fourth image supply devices 100c, 100d is further connected to the image display device 200. FIG. 9A is substantially the same as FIG. 8A except the point that the third and fourth image supply devices 100c, 100d are added. In this example, desktop screens 101c, 101d are displayed respectively in the third and fourth image supply devices 100c, 100d together with the operation window 300. It should be noted that the participants operating the third and fourth image supply devices 100c, 100d are hereinafter called a "user c" and a "user d," respectively. It should be also noted that the projection screen SC is still set to be in the single screen display mode, the supply image 501a is still displayed alone on the projection screen SC.

Figure 9B:
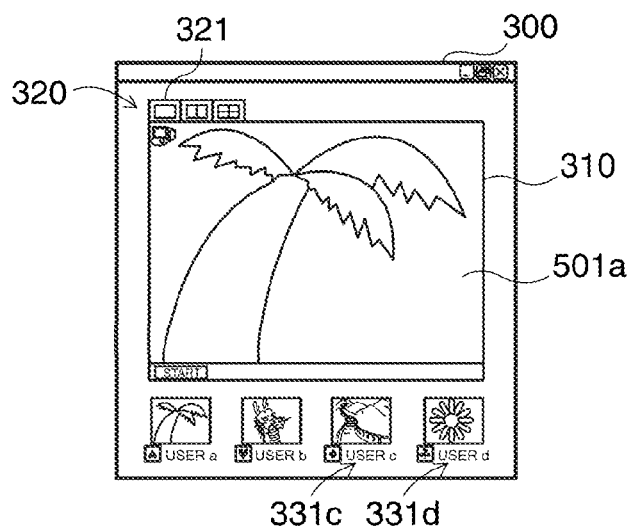

FIG. 9B is a schematic diagram showing the operation window 300 displayed on each of the image supply devices 100a through 100d after each of the third and fourth image supply devices 100c, 100d has established the connection with the image display device 200. FIG. 9B is substantially the same as FIG. 8B except the point that the ID images 331c, 331d of the third and fourth image supply devices 100c, 100d are added. As described above, in the image display system 1000 of the present embodiment, the ID images 331a through 331d are sequentially added to and displayed in the ID image display area 330 in the order in which the image supply devices 100a through 100d are connected to the image display device 200. It should be noted that in the image display system 1000 of the present embodiment, it is assumed that priority is provided to the image supply devices 100a through 100d in the order of the connection.

Here, as described above, in the image display system 1000 of the present embodiment, the display layout of the supply images in the projection screen SC can be changed by operating the operation window 300 in each of the image supply devices 100a through 100d. By the operation of changing the display layout via the operation window 300, it becomes possible to display the supply images, which are supplied by the respective image supply devices 100a through 100d connected to the image display device 200, simultaneously on the projection screen SC.

Figure 10:
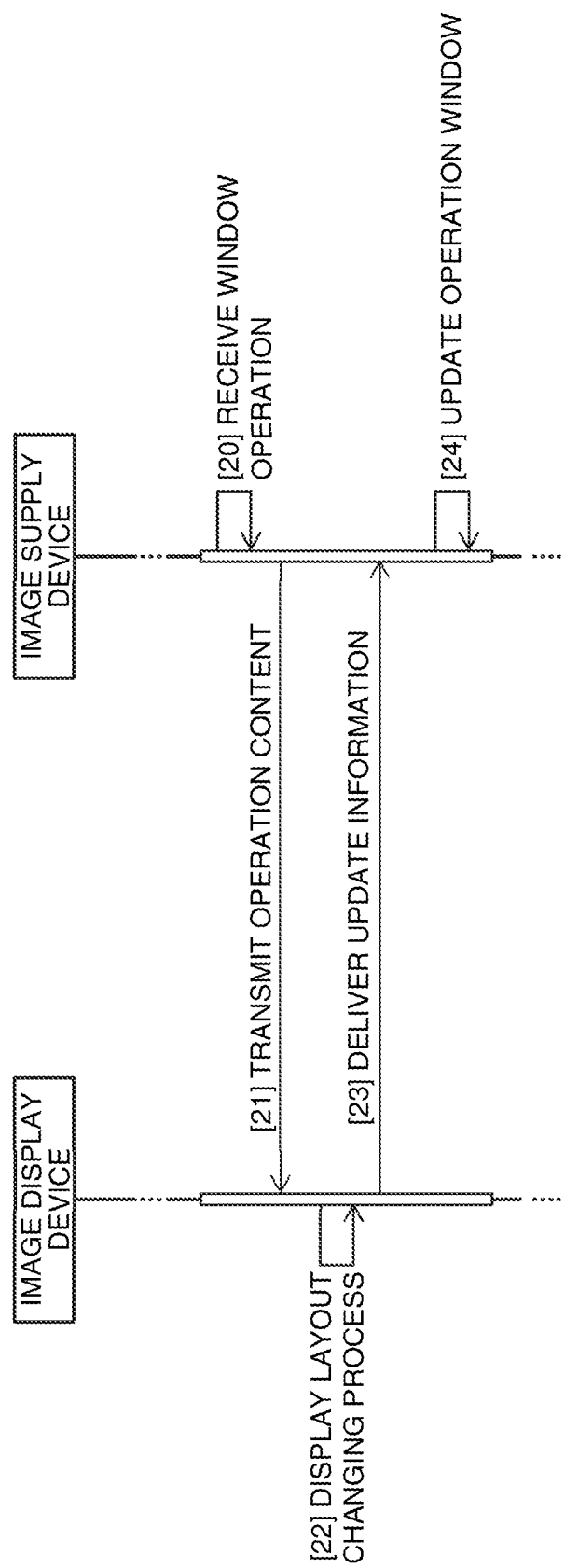
FIG. 10 is an explanatory diagram for explaining communication between the image supply device and the image display device when receiving the operation of changing a display layout.

FIG. 10 is a sequence diagram for explaining the communication between each of the image supply devices 100a through 100d and the image display device 200 when the operation of changing the display layout of the projection screen SC is received via the operation window 300. It should be noted that in FIG. 10, the processing procedure of each of the image supply devices 100a through 100d is shown on the right as one faces the sheet of the drawing in a single line without separating the image supply devices 100a through 100d into individuals.

In response to the operation of the user via the operation window 300 (step [20]), the user interface module M4 of each of the image supply devices 100a through 100d transmits (step [21]) the content of the operation of the user to the image display device 200. The display layout control module M22 of the image display device 200, which has received the content of the operation, changes (step [22]) the settings of the display layout of the projection screen SC in accordance with the content of the operation. It should be noted that on this occasion it is also possible for the display layout control module M22 to issue a transmission request of the supply image if necessary. Further, in accordance with the updated settings of the display layout, the display image generation module M23 generates the display image data using the supply images from the respective image supply devices 100a through 100d.

After reflecting the change in the display layout on the projection screen SC, the update information generation module M25 generates the image data of the screen image 310 based on the display image data of the projection screen SC. Then, the update information generation module M25 delivers (step [23]) the image data of the screen image 310 to each of the image supply devices 100a through 100d as the update information. In each of the image supply devices 100a through 100d, the screen image 310 of the operation window 300 is updated using the update information, and the content of the screen image 310 is synchronized (step [24]) with the display content of the projection screen SC.

As described above, according to the image display system 1000 of the present embodiment, the display layout of the projection screen SC can be changed via any of the image supply devices 100a through 100d providing the image supply device is connected to the image display device 200. Thus, convenience of the image display system 1000 is improved.

Hereinafter, the operation of changing the display layout via the operation window 300 will specifically be explained. It should be noted that as described above in the image display system 1000 of the present embodiment the display content of the screen image 310 of the operation window 300 and the display content of the projection screen SC are synchronized with each other. Therefore, in the explanation hereinafter, the explanation will be presented assuming that if the display content of the screen image 310 is changed, the display content of the projection screen SC is also changed in substantially the same manner.

FIGS. 11A through 11C are explanatory diagrams for explaining switching of the display layout mode in the projection screen SC using a display mode switching button 320 of the operation window 300. Here, the condition in which the first image supply device 100a operated by the user "a" is connected alone to the image display device 200 is assumed for the sake of convenience of explanation. It should be noted that FIGS. 11B and 11C show a pointer 341 the user can arbitrarily move on the desktop screen via the operation section 150.

FIG. 11A shows the operation window 300 in the case in which the first image supply device 100a is connected to the image display device 200, and the supply image 501a is displayed on the projection screen SC in the single screen display mode, and is substantially the same as FIG. 7A. On this occasion, the display mode switching buttons 320 are in the state in which the first button 321 is held down. When the first button 321 is held down as described above, the projection screen SC is set in the single screen display mode.

FIG. 11B is a schematic diagram showing the operation window 300 in the case in which the user "a" holds down the second button 322 of the display mode switching buttons 320 using the pointer 341. When the second button 322 is held down, the projection screen SC is divided laterally into two parts, and the supply image 501a is displayed in the layout frame on the left side as one faces the sheet of the drawing. Hereinafter, the mode of the display layout in which the two layout frames formed by the dividing operation are provided as described above is called a "dual screen display mode."

FIG. 11C is a schematic diagram showing the operation window 300 in the case in which the user "a" holds down the third button 323 of the display mode switching buttons 320 using the pointer 341. When the third button 323 is held down, the projection screen SC is divided into four parts vertically and horizontally, and the supply image 501a is displayed in the layout frame on the upper left as one faces the sheet of the drawing. Hereinafter, the mode of the display layout in which the four layout frames obtained by dividing the projection screen SC vertically and horizontally into four parts are provided is called a "quad screen display mode." As described above, by holding down the first through third buttons 321 through 323 of the display mode switching buttons 320, the display layout of the projection screen SC can be switched to the single screen display mode, the dual screen display mode, and the quad screen display mode, respectively.

FIGS. 12A1 and 12A2 are schematic diagrams for explaining the change in the display layout when the second image supply device 100b operated by the user "b" is connected to the image display device 200 in the dual screen display mode explained with reference to FIG. 11B. It should be noted that FIG. 12A1 is substantially the same as FIG. 11B.

When the second image supply device 100b is connected to the image display device 200 in the dual screen display mode, unlike the case explained with reference to FIGS. 8A and 8B, the layout frame with no image displayed exists in the projection screen SC. Therefore, the supply images 501a, 501b of the first and second image supply devices 100a, 100b are arranged laterally and displayed (FIG. 12A2) on the projection screen SC along the processing procedure on and after the step [6] shown in FIG. 4. Further, in the ID image display area 330 of the operation window 300, there is additionally displayed the ID image 331b of the second image supply device 100b.

FIGS. 12B1 and 12B2 are schematic diagrams for explaining the change in the display layout caused when the second through fourth image supply devices 100b through 100d are sequentially connected to the image display device 200 in the quad screen display mode shown in FIG. 11C. It should be noted that FIG. 12B1 is substantially the same as FIG. 11C. In this case, the supply images 501b through 501d of the second through fourth image supply devices 100b through 100d are arranged in the vacant layout frames of the projection screen SC in the order indicated by the arrow shown in FIG. 12B2 along the processing procedure on and after the step [6] shown in FIG. 4.

Figure 13A:
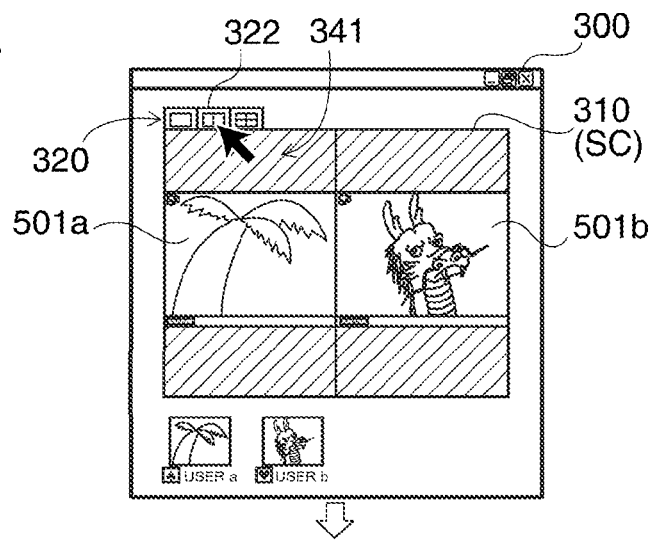
FIGS. 13A through 13C are schematic diagrams for explaining the operation of changing the display content of the projection screen using a first button of the display mode switching buttons in the operation window.

FIGS. 13A through 17B2 are schematic diagrams for explaining the operation for changing the display content of the projection screen SC using the display mode switching buttons 320. FIG. 13A schematically shows the operation window 300 when the first and second image supply devices 100a, 100b are connected to the image display device 200, and the respective supply images 501a, 501b are displayed on the projection screen SC in the dual screen display mode.

Figure 13B:
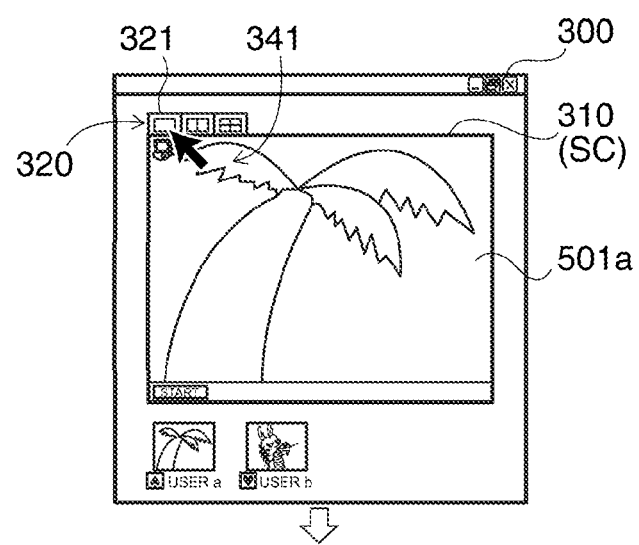
Figure 13C:
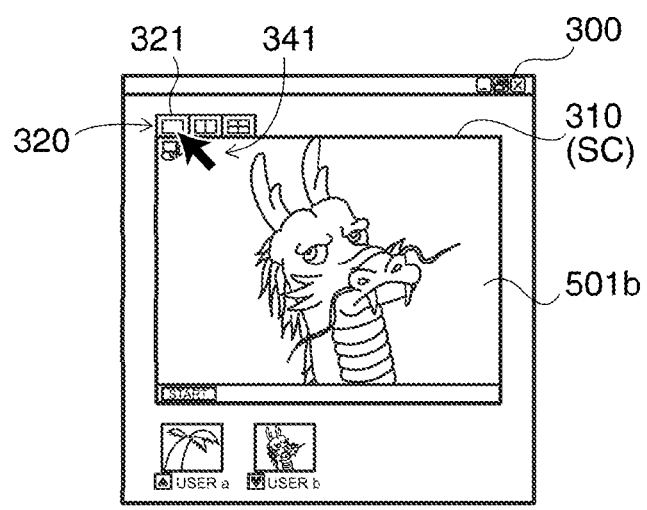

If the first button 321 of the operation window 300 is held down by the pointer 341 in this state, the projection screen SC is switched to the single screen display mode (FIG. 13B). Further, the supply image 501a of the first image supply device 100a connected earlier to the image display device 200 and having a higher priority is displayed on the projection screen SC. Further, when the first button 321 is clicked by the pointer 341, the supply image 501b of the second image supply device 100b is displayed on the projection screen SC while keeping the single screen display mode (FIG. 13C). It should be noted that subsequently, it is possible to arrange that the supply images 501a, 501b are displayed alternately every time the first button 321 is clicked by the pointer 341.

FIG. 14A schematically shows the operation window 300 when all of the image supply devices 100a through 100d are connected to the image display device 200, and the respective supply images 501a through 501d are displayed on the projection screen SC in the quad screen display mode. If the first button 321 of the operation window 300 is held down by the pointer 341 in this state, the projection screen SC is switched to the single screen display mode (FIG. 14B). Further, the supply image 501a of the first image supply device 100a connected earlier to the image display device 200 is displayed on the projection screen SC. Subsequently, every time the first button 321 is clicked by the pointer 341, the supply images 501b through 501d are displayed on the projection screen SC in descending order of priority (FIGS. 14C through 14E). It should be noted that it is possible to arrange that the display state shown in FIG. 14B is restored if the first button 321 is further clicked in the display state shown in FIG. 14E.

FIG. 15A1 schematically shows the operation window 300 when all of the image supply devices 100a through 100d are connected to the image display device 200, the supply image 501b is displayed in one of the layout frames of the dual screen display mode, and the other of the layout frames is in the nondisplay state. It should be noted that the operation method of achieving such a display state will be described later. On this occasion, when the first button 321 is held down by the pointer 341 to switch the mode thereof to the single screen display mode, the supply image 501b having been already displayed is rearranged to the entire surface, and is then displayed (FIG. 15A2).

FIG. 15B1 schematically shows the operation window 300 when the projection screen SC in the single screen display mode is in the nondisplay state in the case in which all of the image supply devices 100a through 100d are connected to the image display device 200. It should be noted that the operation method of achieving such a display state will be described later. On this occasion, if the first button 321 is held down by the pointer 341 and the mode thereof is switched to the single screen display mode, the supply image 501a of the first image supply device 100a with the highest priority is displayed (FIG. 15B2).

FIG. 16A1 schematically shows the operation window 300 when all of the image supply devices 100a through 100d are connected to the image display device 200, and all of the supply images 501a through 501d are displayed simultaneously on the projection screen SC in the quad screen display mode. On this occasion, if the second button 322 is held down by the pointer 341, the projection screen SC is switched to be in the dual screen display mode, and the supply images 501a, 501b are arranged side-by-side in a horizontal direction and displayed simultaneously (FIG. 16A2). It should be noted that it is also possible to arrange that the supply images 501a through 501d are subsequently displayed in pairs while shifting them one-by-one in descending order of priority every time the second button 322 is clicked.

FIG. 16B1 is substantially the same as FIG. 16A1 except the point that only the supply image 501a of the first image supply device 100a is in the nondisplay state. It should be noted that in the image display system 1000 of the present embodiment, when the image supply device is set to the sleep state while keeping the connection with the image display device 200, the supply image of the image supply device is set to the nondisplay state in the projection screen SC. Further, it is also possible to arrange that the required image can arbitrarily be set to the nondisplay state in accordance with the instruction of the user.

If the second button 322 is held down by the pointer 341 in this state, the projection screen SC is switched to the dual screen display mode (FIG. 16B2). Then, the supply images 501b, 501c of the second and third image supply devices 100b, 100c having higher priorities of the image supply devices 100b through 100d not set to the nondisplay state are displayed. It should be noted that it is also possible to arrange that the supply images 501b, 501c, and 501d are subsequently displayed while shifting them one-by-one in descending order of priority every time the second button 322 is clicked.

FIG. 17A1 schematically shows the operation window 300 when the supply image 501a is displayed on the projection screen SC in the single screen display mode in the case in which all of the image supply devices 100a through 100d are connected to the image display device 200. On this occasion, if the third button 323 is held down by the pointer 341, the projection screen SC is switched to the quad screen display mode, and all of the supply images 501a through 501d are arranged and displayed simultaneously (FIG. 17A2). It should be noted that the supply images 501a through 501d are arranged in the order along the priority thereof.

FIG. 17B1 schematically shows the operation window 300 when the first and second image supply devices 100a, 100b are connected to the image display device 200, and the respective supply images 501a, 501b are simultaneously displayed on the projection screen SC in the dual screen display mode. On this occasion, if the third button 323 is held down by the pointer 341, the projection screen SC is switched to the quad screen display mode. Then, the two supply images 501a, 501b are respectively arranged in the upper two layout frames disposed side-by-side in a horizontal direction, and displayed (FIG. 17B2). In this case, the lower layout frames of the projection screen SC remain as vacant display areas. Therefore, the supply image from the image supply device newly connected to the image display device 200 is displayed in one of these layout frames (the process corresponding to the step [6] and the subsequent steps).

In the operation window 300 of the image display system 1000 according to the present embodiment, it is possible to change the display content of the projection screen SC further by the operation explained below besides the operation using the display mode switching buttons 320 described above.

FIGS. 18A1 through 24B2 are schematic diagrams for explaining the operation for changing the display content of the projection screen SC using a slider 342. FIGS. 18A1 and 18B1 each show the operation window 300 in the case in which the first image supply device 100a is connected to the image display device 200, and the supply image 501a is displayed on the projection screen SC in the single screen display mode. FIGS. 18A1 and 18B1 each are substantially the same as FIG. 10A except the point that the slider 342 is shown instead of the pointer 341.

Here, in each of the image supply devices 100a through 100d of the present embodiment, when the pointer 341 is moved to a position on a boundary (a frame line) between the layout frames in the screen image 310 in the operation window, the pointer 341 changes to the slider 342. FIG. 18A1 shows the state in which the slider 342 is displayed at the right circumferential end of the screen image 310, and FIG. 18B1 shows the state in which the slider 342 is displayed at the left circumferential end of the screen image 310.

As described above, in the single screen display mode, the slider 342 is displayed at either one of the right circumferential end and the left circumferential end of the screen image 310, and then the slider 342 is consecutively dragged toward the center of the screen image 310. Then, the projection screen SC is switched to the dual screen display mode, and the supply image 501a having been displayed there is displayed in the layout frame located on the side of the direction in which the slider 342 is dragged (FIGS. 18A2 and 18B2). Further, the display state of the display mode switching buttons 320 is changed to show the state in which the second button 322 is held down instead of the first button 321.

As described above, in the image display system according to the present embodiment, it is possible to switch the mode of the display layout by dragging the slider 342. It should be noted that when the mode of the display layout is switched using the slider 342, the state of the display mode switching buttons 320 is also switched accordingly.

Here, since the first image supply device 100a is connected alone to the image display device 200, the other layout frame remains in the nondisplay state. It should be noted that it is also possible to arrange that in the case in which two or more image supply devices are connected to the image display device 200, the supply images thereof are displayed in the two layout frames in accordance with the priority of the image supply devices.

FIGS. 19A1 and 19B1 are substantially the same as FIGS. 18A2 and 18B2, respectively. In this case, the slider 342 is previously displayed on the boundary between the layout frames located at the center of the screen image 310, and then dragged consecutively toward the side of the layout frame where the supply image 501a is displayed. Then, the supply image 501a is deleted, and the projection screen SC becomes in the nondisplay state in the single screen display mode (FIGS. 19A2 and 19B2).

FIGS. 20A1 and 20B1 each show the operation window 300 when the two image supply devices 100a, 100b are connected to the image display device 200, and the respective supply images 501a, 501b are displayed on the projection screen SC in the dual screen display mode. In this display state, the slider 342 is displayed on the layout frame located at the center of the screen image 310, and the slider 342 is dragged leftward (in the direction of the dashed arrow in FIG. 20A1) or rightward (in the direction of the dashed arrow in FIG. 20B1). When the slider 342 is dragged leftward, the projection screen SC is switched to the single screen display mode, and the supply image 501b having been displayed in the layout frame on the right side is displayed in the entire surface (FIG. 20A2). On the other hand, when the slider 342 is dragged rightward, the projection screen SC is switched to the single screen display mode, and the supply image 501a having been displayed in the layout frame on the left side is displayed in the entire surface (FIG. 20B2).

FIGS. 21A1 and 21B1 are substantially the same as FIGS. 20A1 and 20B1, respectively, except the point that the display position of the slider 342 is different. In FIG. 21A1, the slider 342 is located at an upper circumferential end of the screen image 310, while in FIG. 21B1, the slider 342 is located at a lower circumferential end of the screen image 310. In this display state, when the slider 342 is dragged toward the vertical center of the screen image 310, the display mode of the projection screen SC is switched from the dual screen display mode to the quad screen display mode. More specifically, when the slider 342 is dragged from the lower side to the upper side of the screen image 310 (FIG. 21A1), the display mode of the projection screen SC is switched to the quad screen display mode. Then, the two supply images 501a, 501b having originally been displayed are respectively displayed in the lower two layout frames (FIG. 21A2). On the other hand, when the slider 342 is dragged from the upper side to the lower side of the screen image 310 (FIG. 21B1), the display mode is switched to the quad screen display mode, and the two supply images 501a, 501b are respectively displayed in the upper two layout frames (FIG. 21B2). It should be noted that it is also possible to arrange that in the case in which three or more image supply devices are connected to the image display device 200, the supply image in the nondisplay state is newly displayed in the rest of the layout frames additionally.

FIGS. 22A1 and 22B1 each show the operation window 300 when all of the image supply devices 100a through 100d are connected to the image display device 200, and the respective supply images 501a through 501d are displayed in the quad screen display mode. In this display state, in FIG. 22A1, the slider 342 is dragged downward from a position on the layout frame vertically dividing the screen image 310. Then, the display mode of the projection screen SC is switched to the dual screen display mode, and the two supply images 501a, 501b having been displayed in the upper layout frames in the quad screen display mode are continuously displayed without interruption (FIG. 22A2). On the other hand, in FIG. 22B1, the slider 342 is dragged upward from a position on the layout frame vertically dividing the screen image 310. Then, the display mode of the projection screen SC is switched to the dual screen display mode, and the two supply images 501c, 501d having been displayed in the lower layout frames in the quad screen display mode are continuously displayed without interruption (FIG. 22B2).

FIGS. 23A1 and 23B1 each show the state in which the first image supply device 100a or the fourth image supply device 100d is logged out in the state explained with reference to FIGS. 22A1 and 22B1, respectively. Specifically, in FIG. 23A1, the ID image 331a of the first image supply device 100a is deleted, while in FIG. 23B1, the ID image 331d of the fourth image supply device 100d is deleted. In this state, when executing the operation of the slider 342 substantially the same as explained with reference to FIGS. 22A1 and 22B1, the display state of the projection screen SC is switched to the dual screen display mode, and the layout frame on the side toward which the slider 342 is dragged is eliminated. Then, there appears the state (FIGS. 23A2 and 23B2) in which either one of the supply images 501b, 501c is displayed in one of the layout frames of the projection screen SC, and no image is displayed in the other of the layout frames.

FIG. 24A1 shows the operation window 300 when all of the image supply devices 100a through 100d are connected to the image display device 200, and the respective supply images 501a through 501d are displayed in the quad screen display mode. On this occasion, the slider 342 is displayed at an upper circumferential end of the screen image 310, and is dragged up to the lower circumferential end thereof. Then, the display mode of the projection screen SC is switched to the single screen display mode, and all of the supply images 501a through 501d are set to the nondisplay state (FIG. 24A2). It should be noted that the same can be applied to the case in which the slider 342 is dragged from a right or left circumferential end of the screen image 310 to the opposite circumferential end thereof in the quad screen display mode (FIGS. 24B1 and 24B2).

FIGS. 25A1, 25A2, 25B1 and 25B2 are schematic diagrams for explaining the operation of changing the display state of the projection screen SC by the image selection using the pointer 341. FIG. 25A1 shows the operation window 300 when the supply images 501a, 501b are displayed in the dual screen display mode in the condition in which all of the image supply devices 100a through 100d are connected to the image display device 200. It should be noted that in FIG. 25A1, the supply image 501a is surrounded by a broken line, thus schematically indicating that the supply image 501a is selected by the pointer 341.

Here, the supply image 501a is designated on the screen image 310 of the operation window 300 by the pointer 341 and then double-click is performed. Then, the display mode of the projection screen SC is switched to the single screen display mode, and the supply image 501a is displayed in an enlarged manner (FIG. 25A2). The same can be applied to the case in which the supply image 501a is designated and then double-click is executed in the quad screen display mode (FIGS. 25B1 and 25B2). As described above, in the image display system 1000 according to the present embodiment, it is possible to arbitrarily select one of a plurality of supply images arranged in the divisions on the projection screen SC, and to display it in the entire surface in an enlarged manner.

FIGS. 26A1, 26A2, 26B1, 26B2, 27A1, 27A2, 27B1, and 27B2 are schematic diagrams for explaining the operation of changing the display state of the projection screen SC by ID image selection using the pointer 341. FIG. 26A1 is substantially the same as FIG. 25A1 except the point that the image selected by the pointer 341 is different. In FIG. 26A1, the supply image thumbnail 332a is selected out of the ID images 331a through 331d displayed in the ID image display area 330. When double-clicking the supply image thumbnail 332a using the pointer 341, the display mode of the projection screen SC is switched to the single screen display mode, and the supply image 501a from the first image supply device 100a is displayed in an enlarged manner (FIG. 26A2). The same can be applied to the case of double-clicking the supply image thumbnail 332a in the quad screen display mode (FIGS. 26B1 and 26B2).

FIG. 27A1 is substantially the same as FIG. 26A1 except the point that the supply image 501a is displayed in the single screen display mode, and the point that the supply image thumbnail 332b is selected by the pointer 341. When the supply image 501a is displayed alone on the projection screen SC in the single screen display mode, double click on the supply image thumbnail 332b is performed using the pointer 341. Then, the supply image 501b from the second image supply device 100b is displayed on the projection screen SC instead of the supply image 501a (FIG. 27A2). It should be noted that the same can be applied to the case in which double-click on the supply image thumbnail 332b is performed using the pointer 341 when the projection screen SC is in the nondisplay state (FIGS. 27B1 and 27B2).

It should be noted that it is also possible to arrange that the display state of the projection screen SC can be changed by double-clicking the user identification image instead of the supply image thumbnail. As described above, in the image display system 1000 according to the present embodiment, it is possible to arbitrarily select the image supply device from the ID images displayed on the operation window 300, and to display the supply image from the selected image supply device in the entire surface on the projection screen SC.

Figure 28A:
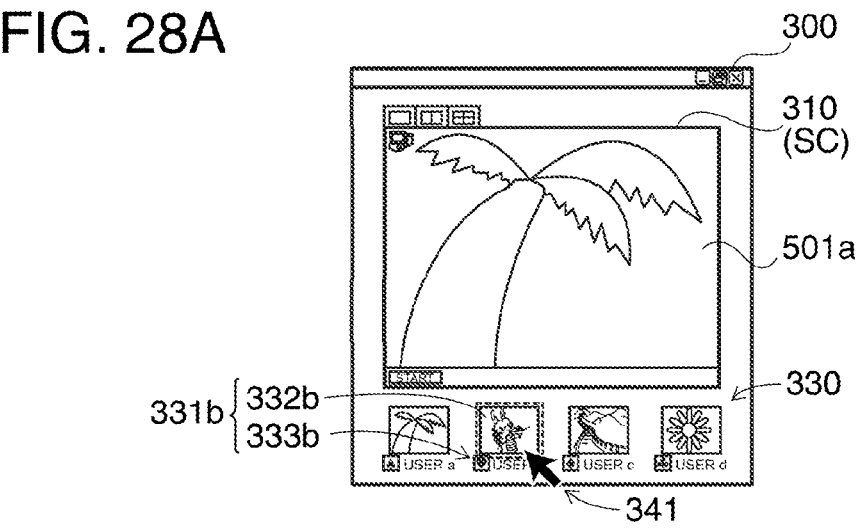
FIGS. 28A through 28C are schematic diagrams for explaining the operation of changing the display state of the projection screen by drag and drop of the ID image using the pointer in the operation window.
Figure 28B:
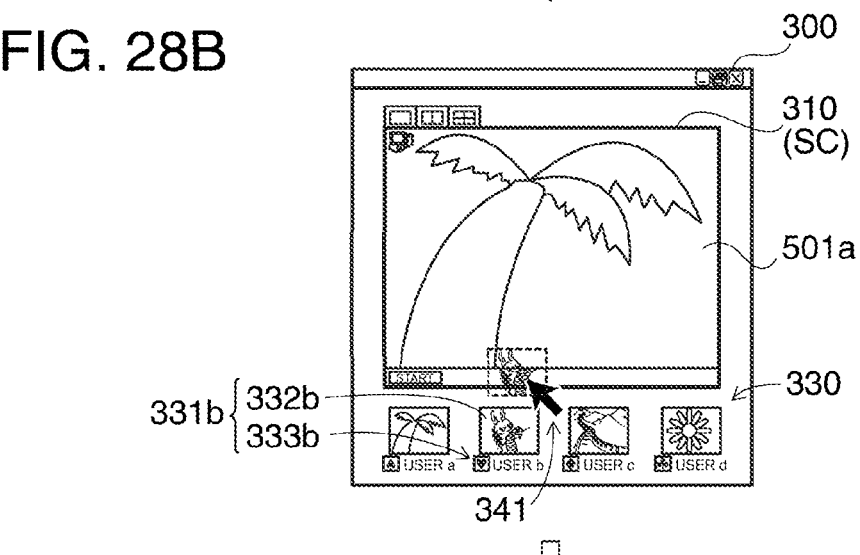
Figure 28C:
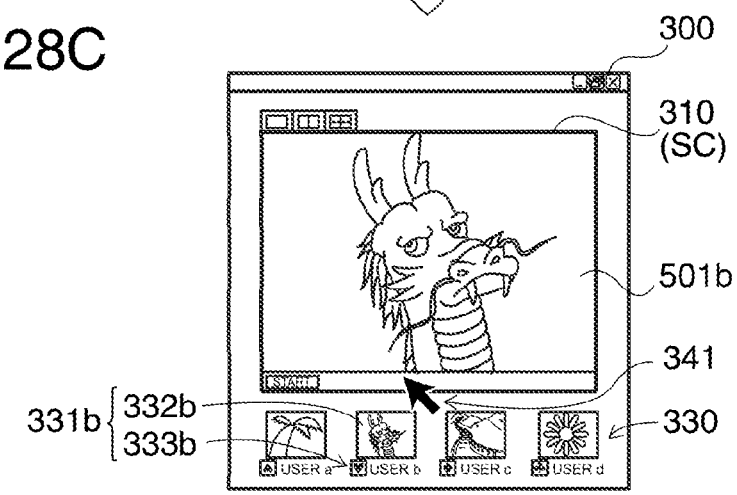

FIGS. 28A through 30B2 are schematic diagrams for explaining the operation of changing the display state of the projection screen SC by drag-and-drop of the ID image using the pointer 341. FIG. 28A is substantially the same as FIG. 27A1. In the display state shown in FIG. 28A, the supply image thumbnail 332b is dragged and dropped onto the screen image 310 using the pointer 341 (FIG. 28B). Then, the supply image 501b is displayed on the projection screen SC instead of the supply image 501a (FIG. 28C). It should be noted that in the image display system 1000 according to the present embodiment, switching of the display layout mode is performed depending on the location where the supply image thumbnail 332b is dropped. The details thereof will be described later.

FIG. 29A1 shows the operation window 300 when all of the image supply devices 100a through 100d are connected to the image display device 200, and no image is displayed in either of the two layout frames in the dual screen display mode. On this occasion, the supply image thumbnail 332b is dragged and then dropped in the layout frame on the left side in the screen image 310. Then, the supply image 501b is displayed in the layout frame on the left side of the projection screen SC (FIG. 29A2). On the other hand, in the case in which the supply image thumbnail 332b is dragged and dropped in the layout frame on the right side using the pointer 341 (FIG. 29B1), the supply image 501b is displayed in the layout frame on the right side of the projection screen SC (FIG. 29B2). It should be noted that it is also possible to arrange that in the case in which the supply image from another image supply device has already been displayed in the layout frame to which the supply image thumbnail is dropped, the previous supply image is replaced.

FIG. 30A1 shows the operation window 300 when all of the image supply devices 100a through 100d are connected to the image display device 200, and only the layout frame at the lower right stage is in the nondisplay state in the quad screen display mode. It should be noted that the three supply images 501a through 501c are displayed on the projection screen SC. In this case, the supply image thumbnail 332d corresponding to the supply image 501d remaining in the nondisplay state is dragged and dropped in the layout frame remaining in the nondisplay state using the pointer 341. Then, the supply image 501d from the fourth image supply device 100d is displayed in this layout frame (FIG. 30A2).

FIG. 30B1 shows the operation window 300 when all of the image supply devices 100a through 100d are connected to the image display device 200, and all of the supply images 501a through 501d are displayed on the projection screen SC in the quad screen display mode. On this occasion, for example, the supply image thumbnail 332d is dragged and dropped in the layout frame, in which the supply image 501c from the third image supply device 100c is displayed, using the pointer 341. Then, the display position of the supply image 501c and the display position of the supply image 501d are replaced with each other (FIG. 30B2).

As described above, in the image display system 1000 according to the present embodiment, in the operation window 300, the supply image from the image supply device represented by the ID image can be displayed in the layout frame by dragging and dropping the ID image in the layout frame on the screen image 310. Here, in the image display system 1000 according to the present embodiment, the mode of the display layout can be switched further by drag-and-drop of the ID image using the pointer 341. A specific method thereof will hereinafter be explained.

FIGS. 31A through 32B3 are schematic diagrams for explaining a switching operation of the display mode of the projection screen SC by drag-and-drop of the ID image using the pointer 341. FIG. 31A shows the operation window 300 when all of the image supply devices 100a through 100d are connected to the image display device 200, and the supply image 501a is displayed on the projection screen SC in the single screen display mode. It should be noted that in FIG. 31A, the screen image 310 is divided into three image areas LA, CA, RA in the lateral direction by providing the hatching to the screen image 310 for the sake of convenience of explanation.

When the display state shown in FIG. 31A appears, the supply image thumbnail 332b corresponding to the supply image 501b of the second image supply device 100b is dragged and dropped on the screen image 310 using the pointer 341 as explained above with reference to FIGS. 28A, 28B, and 28C. In this case, when dropping the supply image thumbnail 332b in the image area CA located at a relatively center of the screen image 310, the supply image to be displayed on the projection screen SC is replaced while keeping the single screen display mode similarly to the case explained with reference to FIGS. 28A, 28B, and 28C (FIG. 31B1).

On the other hand, when dropping the supply image thumbnail 332b in the image area LA shifted toward a relatively left circumferential end of the screen image 310, the display mode of the projection screen SC is switched to the dual screen display mode. Further, the supply image 501b from the second image supply device 100b is displayed in the layout frame on the left side, and the supply image 501a from the first image supply device 100a having originally been displayed there is displayed in the layout frame on the right side (FIG. 31B2). When dropping the supply image thumbnail 332b in the image area RA shifted toward a relatively right circumferential end of the screen image 310, the display mode of the projection screen SC is also switched to the dual screen display mode. Further, the supply image 501b from the second image supply device 100b is displayed in the layout frame on the right side, and the supply image 501a from the first image supply device 100a having originally been displayed there is displayed in the layout frame on the left side (FIG. 31B3).

FIG. 32A shows the operation window 300 when all of the image supply devices 100a through 100d are connected to the image display device 200, and the supply images 501a and 501b are displayed on the projection screen SC in the dual screen display mode. It should be noted that in FIG. 32A, the screen image 310 is divided into three image areas UA, CA, BA in the vertical direction by providing the hatching to the screen image 310.

In the display state shown in FIG. 32A, the supply image thumbnail 332c is dragged and dropped onto the screen image 310 using the pointer 341. On this occasion, when dropping the supply image thumbnail 332c in, for example, the image area CA at a relatively center of the screen image 310, the supply image 501c corresponding to the supply image thumbnail 332c is displayed (FIG. 32B1) in the layout frame in which the supply image thumbnail 332c is dropped while keeping the dual screen display mode.

On the other hand, when dropping the supply image thumbnail 332c in the image area UA shifted toward a relatively upper circumferential end of the screen image 310, the display mode of the projection screen SC is switched to the quad screen display mode. Here, in the case in which the supply image thumbnail 332c has been dropped in the layout frame on the left side, the supply image 501c is displayed in the layout frame on the upper left stage. In the case in which the supply image thumbnail 332c has been dropped in the layout frame on the right side, the supply image 501c is displayed in the layout frame on the upper right stage. The supply images 501a, 501b from the first and second image supply devices 100a, 100b having originally been displayed are displayed in the two layout frames on the lower stage, respectively (FIG. 32B2).

Further, when dropping the supply image thumbnail 332c in the image area DA shifted toward a relatively lower circumferential end of the screen image 310, the display mode of the projection screen SC is also switched to the quad screen display mode. Then, in the case in which the supply image thumbnail 332c has been dropped in the layout frame on the left side, the supply image 501c is displayed in the layout frame on the lower left stage. In the case in which the supply image thumbnail 332c has been dropped in the layout frame on the right side, the supply image 501c is displayed in the layout frame on the lower right stage. The supply images 501a, 501b from the first and second image supply devices 100a, 100b having originally been displayed are displayed in the two layout frames on the upper stage, respectively (FIG. 32B3).

As described above, according to the image display system 1000 of the present embodiment, it is possible to arrange the supply images 501a through 501d from the four image supply devices 100a through 100d in the divisions of the common projection screen SC and to display them simultaneously. Further, each user can arbitrarily operate the display state on the projection screen SC via the operation window 300, which is displayed in the display section 160 of each of the image supply devices 100a through 100d but is not shown on the projection screen SC. As described above, there is provided novel convenience such that each of the participants can effectively make a presentation in conferences, presentations and the like.

B. Modified Examples

It should be noted that the invention is not limited to the specific examples and the embodiment described above, but can be put into practice in various forms within the scope or the spirit of the invention, and the following modifications, for example, are also possible.

B1. First Modified Example

In the embodiment described above, it is possible to replace a part of the configuration realized by hardware with software, or to replace a part of the configuration realized by software with hardware. For example, it is also possible to make a part of the function of the image supply program P1 as hardware.

B2. Second Modified Example

In the embodiment described above, the four image supply devices 100a through 100d are connected to the image display device 200. However, it is also possible to arrange that a plurality of image supply devices is additionally connected to the image display device 200.

B3. Third Modified Example

In the embodiment described above, the image display device 200 has display modes of a divisional arrangement such as a dual screen display mode of dividing the projection screen SC vertically into two parts or a quad screen display mode of dividing it vertically into two parts and further dividing each of the divisions horizontally into two parts. However, it is also possible to arrange that the image display device 200 has many additional display modes of a divisional arrangement. For example, it is also possible to arrange that the image display device 200 has a display mode of dividing the projection screen into three parts either vertically or horizontally or a display mode of dividing it into many more layout frames.

B4. Fourth Modified Example

In the embodiment described above, in the display modes of a divisional arrangement provided to the image display device 200, each of the layout frames is configured to have the same size. However, if is also possible to arrange that each of the layout frames of the projection screen SC is configured to have a different size. It is also possible to arrange that each of the users can arbitrarily change the sizes of the layout frames via the operation window 300.

B5. Fifth Modified Example

In the embodiment described above, the image display device 200 functions as a sever in the image display system 1000 for, for example, delivering the update information for synchronizing the display content of the operation window 300 to each of the image supply devices 100a through 100d connected thereto. However, the update information of the operation window 300 need not be delivered by the image display device 200. For example, it is possible to arrange that the image supply device first connected to the image display device 200 delivers the update information for synchronizing the operation window 300 of each of the image display device 200.

B6. Sixth Modified Example

In the embodiment described above, the image supply devices 100a through 100d are provided with priority descending as the order of connection to the image display device 200. However, it is also possible to arrange that the priority of the image supply devices 100a through 100d is provided along another order. For example, it is possible to arrange that the priority of the image supply devices 100a through 100d is set previously, or can arbitrarily be set or modified by the user. Further, it is not necessarily required to provide such priority to the image supply devices 100a through 100d. It should be noted that it is preferable to provide priority to the image supply devices 100a through 100d in order for performing control of the layout of each of supply images on the projection screen.

B7. Seventh Modified Example

In the embodiment described above, the image supply devices 100a through 100d supply the image display device 200 with the own display image except the operation window 300 as the respective supply images 501a through 501d. However, it is also possible to arrange that each of the image supply devices 100a through 100d supplies the image display device 200 with only an arbitrary area of the display image such as a window of an application program. It is sufficient for each of the supply images 501a though 501d to be generated using the display image.

B8. Eighth Modified Example

Although in the embodiment described above, the operation window 300 is provided with the ID image display area 330, it is also possible to arrange that the ID image display area 330 is omitted. However, the ID image display area 330 functions as an area for displaying the supply images as a list, and therefore, is preferably provided in order for improving convenience of the user as a participant. Further, in the embodiment described above, although the operation window 300 is provided with the display mode switching buttons 320, the display mode switching buttons 320 can be omitted. Further, it is also possible to arrange that there is displayed an icon for switching the display mode having a display form different from that of the display mode switching buttons 320.

B9. Ninth Modified Example

In the embodiment described above, the display content of the screen image 310 is synchronized with the display content of the projection screen SC. However, it is not necessarily required for the screen image 310 to reflect all of the display content of the projection screen SC, and it is also possible to arrange that the screen image 310 reflects only the display layout of the supply images in the projection screen SC. In other words, it is also possible to arrange that the layout frames of the projection screen SC is displayed alone in the screen image 310.

B10. Tenth Modified Example

In the embodiment described above, in the case in which the image supply device is newly connected, if there is not vacant layout frame, the supply image of the image supply device remains in the nondisplay state (step [6] in FIG. 4). However, it is also possible to arrange that in the case in which the image supply device is newly connected, if there is no vacant layout frame, the display mode is automatically switched to generate the layout frame, and the supply image is displayed immediately.

B11. Eleventh Modified Example

In the embodiment described above, it is also possible to arrange that the display position of each of the supply images 501a through 501d can be changed by dragging the supply images 501a through 501d displayed in the screen image 310 of the operation window 300 onto another layout frame using the pointer 341.

B12. Twelfth Modified Example

In the embodiment described above, the image display device 200 is configured as a projector for projecting an image on the projection screen SC. However, the image display device 200 is not necessarily required to be a projector, but it is possible to arrange that the image display device 200 is an image display device for generating an image on, for example, a liquid crystal display and an organic EL display.

B13. Thirteenth Modified Example

Although in the embodiment described above, the image supply devices 100a through 100d are configured with personal computers, it is not necessarily required to configure the image supply devices 100a through 100d with personal computers. Further, even in the case in which the image supply devices 100a through 100d are configured with personal computers, the operating system to be loaded is not necessarily required to be Windows (registered trademark). It should be noted that the image supply devices 100a through 100d are preferably provided with a function capable of capturing an image excluding the operation window 300 from the display image.

B14. Fourteenth Modified Example

Although in the embodiment described above, the image supply devices 100a through 100d and the image display device 200 are wirelessly connected to each other, it is also possible to arrange that the image supply devices 100a through 100d and the image display device 200 are connected to each other with wire.

What is claimed is:

1. An image display system having a common screen area allowing a plurality of users to view a common image, comprising:
    a plurality of image supply devices each having an image display section, and an image transmission section adapted to generate a supply image using an image displayed in the image display section and to externally transmit the supply image; and
    an image display device capable of dividing the common screen area into one or more screen areas, and of displaying the supply image supplied from each of the plurality of image supply devices in the one or more screen areas of the common screen area,
wherein:
    each of the plurality of image supply devices supplies a display image of the image display section to the image display device as the supply image,
    each of the plurality of image supply devices displays, in the image display section, a common screen area operating image to change a display layout of the common screen area,
    the common screen area operating image of at least one image supply device of the plurality of image supply devices includes:
        a first area that displays a plurality of identification images, each of the plurality of identification images identifying a separate one of the plurality of image supply devices, and
        a second area that is divided into plural areas to be correlated to the plurality of identification images,
    the positions of each of the supply images of the plurality of supply devices are changeable in the common screen area by an operation on the common screen area operating image of a single one of the plurality of image supply devices; and
    the image display device changes the display layout of the common screen area in accordance with the operation via the common screen area operating image of the single one of the plurality of image supply devices.

2. The image display system according to claim 1, wherein the second area of the common screen area operating image of each of the plurality of image supply devices includes a layout image having divisional layout frames showing a configuration of one or more screen areas in the common screen area,
    the divisional layout frames can be changed by an operation on the common screen area operating image of at least one of the plurality of image supply devices, and
    the image display device performs display after changing a configuration of the one or more screen areas in the common screen area in accordance with the change of the divisional layout frames.

3. The image display system according to claim 2, wherein the image display device generates new divisional layout frames in response to an operation of dragging a boundary between the divisional layout frames into an area in the layout frame on the common screen area operating image of the at least one of the plurality of image supply devices, and
    the image display device deletes the divisional layout frames in response to an operation of dragging the boundary existing between the divisional layout frames out of the layout image on the common screen area operating image of the at least one of the plurality of image supply devices.

4. The image display system according to claim 2, wherein the image display device displays the supply image identified by the identification image selected in the identification image display area on the common screen area operating image of at least one of the plurality of image supply devices.

5. The image display system according to claim 4, wherein the image display device displays the supply image identified by the identification image in the screen area in the common screen area corresponding to the divisional layout frame in which the identification image is dragged and dropped when the user drags and drops the identification image selected from the identification image list area in the divisional layout frame.

6. The image display system according to claim 4, wherein the image supply device generates new divisional layout frames for the supply image identified by the identification image in an area corresponding to a position inside the divisional layout frame and shifted toward a circumferential end when the identification image selected from the identification image list area is dragged and dropped into the position, and the image display device displays the supply image identified by the identification image in the screen area corresponding to the new divisional layout frame of the common screen area.

7. The image display system according to claim 1, wherein the common screen area operating image includes a changeover switch image adapted to switch a division number in the common screen area, and the image display device divides the common screen area into the division number designated with the changeover switch image.

8. The image display system according to claim 1, wherein the image supply device supplies the display image of the image display section except the common screen operating image.

9. The image display system according to claim 1, wherein the image supply device supplies a part of the display image of the image display section.

10. The image display system according to claim 1, wherein each identification image of the plurality of identification images comprises a thumbnail image of the supply image generated by the image supply device identified by the identification image.

11. The image display system according to claim 1, wherein the identification image display area is not displayed by the image display device during the time that the identification image display area is displayed in the common screen area operating images of each of the plurality of image supply devices.

12. The image display system according to claim 1, wherein the positions of each of the supply images of the plurality of supply devices are changeable in the common screen area by an operation on the common screen area operating image of each of the plurality of image supply devices.

13. An image display method in an image display system capable of displaying supply images respectively supplied from a plurality of image supply devices on one or more screen areas of a common screen area divided into the one or more screen areas via an image display device, the method comprising:

(a) displaying a common screen area operating image to operate a display layout of the common screen area in each of image display sections of the image supply devices, the common screen area operating image of at least one image supply device of the plurality of image supply devices including:

a first area that displays a plurality of identification images, each of the plurality of identification images identifying a separate one of the plurality of image supply devices, and a second area that is divided into plural areas to be correlated to the plurality of identification images;

(b) generating the supply images using a display image displayed in the image display section in each of the image supply devices, and supplying the image display device with the supply image; and (c) changing the display layout of the common screen area in the image display device in accordance with an operation via the common screen area operating image of a single one of the plurality of image supply devices, wherein the positions of each of the supply images of the plurality of supply devices are changeable in the common screen area by an operation on the common screen area operating image of the single one of the plurality of image supply devices.

14. An image display device capable of displaying supply images from a plurality of image supply devices each having an image display section and an image transmission section adapted to generate a supply image using an image displayed in the image display section and to externally transmit the supply image on a common screen area allowing a plurality of users to view a common image, wherein the image display device:

changes a display layout of the common screen area in response to an operation via a common screen area operating image displayed in an image display section of a single one of the plurality of image supply devices, the common screen area operating image of at least one image supply device of the plurality of image supply devices including:

a first area that displays a plurality of identification images, each of the plurality of identification images identifying a separate one of the plurality of image supply devices, and a second area that is divided into plural areas to be correlated to the plurality of identification images; and divides the common screen area into one or more screen areas to display a display image of the image display section supplied as a supply image from each of the plurality of image supply devices, wherein the positions of each of the supply images of the plurality of supply devices are changeable in the common screen area by an operation on the common screen area operating image of the single one of the plurality of image supply devices.

* * * * *